(12) United States Patent
Kawai et al.

(10) Patent No.: US 10,673,627 B2
(45) Date of Patent: Jun. 2, 2020

(54) ENCRYPTION DEVICE, SEARCH DEVICE, COMPUTER READABLE MEDIUM, ENCRYPTION METHOD, AND SEARCH METHOD

(71) Applicant: MITSUBISHI ELECTRIC CORPORATION, Tokyo (JP)

(72) Inventors: Yutaka Kawai, Tokyo (JP); Takato Hirano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 85 days.

(21) Appl. No.: 15/774,498

(22) PCT Filed: Jan. 18, 2016

(86) PCT No.: PCT/JP2016/051244
§ 371 (c)(1),
(2) Date: May 8, 2018

(87) PCT Pub. No.: WO2017/126000
PCT Pub. Date: Jul. 27, 2017

(65) Prior Publication Data
US 2019/0260583 A1    Aug. 22, 2019

(51) Int. Cl.
*H04L 9/08* (2006.01)
*G06F 16/903* (2019.01)
(Continued)

(52) U.S. Cl.
CPC ............ *H04L 9/0869* (2013.01); *G06F 7/588* (2013.01); *G06F 16/00* (2019.01);
(Continued)

(58) Field of Classification Search
CPC ... H04L 9/0869; G06F 16/90335; G06F 7/588
(Continued)

(56) References Cited

U.S. PATENT DOCUMENTS

2002/0038421 A1    3/2002  Hamada
2004/0172538 A1*   9/2004  Satoh ...................... G06F 21/80
                                                            713/175

(Continued)

FOREIGN PATENT DOCUMENTS

JP    2002-108910 A    4/2002
JP    2003-296331 A   10/2003
(Continued)

OTHER PUBLICATIONS

Extended European Search Report issued in corresponding European Application No. 16886243.1 dated Aug. 13, 2018.
(Continued)

*Primary Examiner* — Anthony D Brown
(74) *Attorney, Agent, or Firm* — Birch, Stewart, Kolasch & Birch, LLP.

(57) ABSTRACT

Using three pieces of element data $w_1$, $w_2$, and $w_3$ obtained by partitioning storage data D, an encryption unit generates three sets of a first set $A_1$ in which the first to third pieces of element data are sequentially arranged, a second set $A_2$ in which the second to third pieces of element data are sequentially arranged, and a third set $A_3$ composed of the third piece of element data. The encryption unit encrypts each piece of element data included in each set with a random number $R_{(1)}$ by a CBC mode.

11 Claims, 14 Drawing Sheets

(51) Int. Cl.
*G06F 7/58* (2006.01)
*G06F 21/62* (2013.01)
*H04L 9/06* (2006.01)
*G09C 1/00* (2006.01)
*G06F 16/00* (2019.01)

(52) U.S. Cl.
CPC .... *G06F 16/90335* (2019.01); *G06F 21/6209* (2013.01); *G09C 1/00* (2013.01); *H04L 9/06* (2013.01); *H04L 9/0662* (2013.01)

(58) Field of Classification Search
USPC .......................................................... 380/44
See application file for complete search history.

(56) References Cited

U.S. PATENT DOCUMENTS

| | | | |
|---|---|---|---|
| 2012/0159180 A1 | 6/2012 | Chase et al. | |
| 2015/0046450 A1 | 2/2015 | Yoshino et al. | |
| 2015/0082405 A1* | 3/2015 | Sakemi | G06F 21/31 726/7 |

FOREIGN PATENT DOCUMENTS

| | | |
|---|---|---|
| JP | 2011-147074 A | 7/2011 |
| JP | 2011-198079 A | 10/2011 |
| JP | 2012-150732 A | 8/2012 |
| JP | 2013-130825 A | 7/2013 |
| JP | 2013-156675 A | 8/2013 |
| JP | 5442161 B2 | 3/2014 |
| JP | 2014-126621 A | 7/2014 |
| JP | 2015-35072 A | 2/2015 |

OTHER PUBLICATIONS

Chase et al., "Substring-Searchable Symmetric Encryption", Proceedings on Privacy Enhancing Technologies 2015; 2015 (2), pp. 263-281.
Curtmola et al., "Searchable Symmetric Encryption: Improved Definitions and Efficient Constructions", ACMCCS, 2006, pp. 1-33.
International Search Report for PCT/JP2016/051244 (PCT/ISA/210) dated Apr. 12, 2016.
Japanese Office Action issued in JP Patent Application No. 2017-546744 dated Oct. 10, 2017.
Li et al., "Fuzzy Keyword Search over Encrypted Data in Cloud Computing", Mini-Conference at IEEE Infocom 2010, total of 5 pages.
Meyer et al., "Cryptography: a New Dimension in Computer Data Security", A Guide for the Design and Implementation of Secure Systems, John Wiley & Sons, 1982, total of 33 pages.
Song et al., "Practical Techniques for Searches on Encrypted Data", 2000 IEEE, total of 16 pages.
Wang et al., "Achieving Usable and Privacy-assured Similarity Search over Outsourced Cloud Data", 2012 Proceedings IEEE INFOCOM, pp. 451-459.

* cited by examiner

ENCRYPTION DEVICE, SEARCH DEVICE, COMPUTER READABLE MEDIUM, ENCRYPTION METHOD, AND SEARCH METHOD

TECHNICAL FIELD

The present invention relates to an encryption device, a search device, an encryption program, a search program, an encryption method, and a search method which are used in a searchable encryption system.

BACKGROUND ART

Searchable encryption is a technique that allows searching while search target data and search content remain encrypted.

In recent years, with the spread of cloud services and the like, data management on the Internet has become possible. However, for the data management on the Internet, there are risks such that a server such as a cloud which is an outsourcing contractor of the data management may be infected with malware such as a computer virus, and that an administrator of the server may commit fraud, thereby leaking outsourced data to the outside. If the data outsourced to the server is personal information or confidential corporate data, this leakage is a serious problem.

There is an encryption technique as a method to avoid such a security threat. However, if data is simply encrypted and stored in the server, there arises a problem that searching of the data cannot be performed. In order to avoid this problem, there has been devised a method in which when a search is performed, encrypted data stored on the server is once decrypted to then perform the search. However, the data returns to plaintext for a certain period of time in the server, so that this method cannot be regarded as adequate as a countermeasure.

Therefore, a "searchable encryption technique" which is a cryptographic technique that allows searching while data remains encrypted has been devised. Many specific methods of the searchable encryption technique have been disclosed in recent years.

In the searchable encryption technique, schemes that allow "exact match searching" which is simple searching (see Non-Patent Literature 1, for example) have been mainly considered. In recent years, schemes that allow more flexible searching, for example, "partial match searching" (see Patent Literature 1 and Non-Patent Literature 2, for example), schemes that allow "similarity searching" (see Non-Patent Literature 3 and Non-Patent Literature 4, for example), and the like have also been considered. Hereinafter, a scheme that allows partial match searching will be referred to as a "searchable encryption technique with partial matching", and a searchable encryption technique that allows similarity searching will be referred to as a "similarity searchable encryption technique".

The searchable encryption technique is broadly divided into two types, schemes based on public-key cryptography and schemes based on common-key cryptography.

CITATION LIST

Patent Literature

Patent Literature 1: JP 2014-126621 A

Non-Patent Literature

Non-Patent Literature 1: R. Curtmola, J. Garay, S. Kamara, and R. Ostrovsky. "Searchable Symmetric Encryption: Improved Definitions and Efficient Constructions". ACM CCS 2006.

Non-Patent Literature 2: M. Chase and E. Shen. "Substring-Searchable Symmetric Encryption", PETS 2015.

Non-Patent Literature 3: J. Li, Q. Wang, C. Wang, N. Cao, K. Ren, and W. Lou. "Fuzzy Keyword Search over Encrypted Data in Cloud Computing", Mini-Conference at IEEE Infocom 2010.

Non-Patent Literature 4: C. Wang, K. Ren, S. Yu, and K. M. R. Urs. "Achieving Usable and Privacy-assured Similarity Search over Outsourced Cloud Data", IEEE Infocom 2012.

SUMMARY OF INVENTION

Technical Problem

Existing high-speed searchable encryption techniques with partial matching based on a common-key cryptographic technique such as AES, HMAC, or SHA-256 have the following problems.

Patent Literature 1 discloses a technique in which data is partitioned into pieces, each composed of a few characters, to be individually encrypted, thereby achieving partial match searching while the data remains encrypted. For example, the data is partitioned into one-character or two-character pieces and then encrypted.

However, if the data is partitioned into pieces, each composed of a small number of characters, there is a possibility that there may appear a large number of identical pieces of partitioned data. This technique employs a deterministic encryption scheme which always generates the same ciphertext from the same data, so that encrypting the same partitioned data generates exactly the same ciphertext. Thus, there is a problem that it is vulnerable to a frequency analysis attack.

Note that the frequency analysis attack is an attack method in which frequencies of ciphertexts having the same values are matched with public information on frequencies (such as a distribution of Japanese surnames), thereby inferring original data from a ciphertext without using a key used for encryption.

Non-Patent Literature 2 discloses a searchable encryption technique with partial matching which is not vulnerable to the frequency analysis attack as described above, and which can reduce the size of encrypted data to be stored using a certain tree structure (hereinafter referred to as a storage encrypted tag). However, in this technique, the size of encrypted data used for searching (hereinafter referred to as a search encrypted tag) becomes large, and a large number of interactions between a user and a server occur in searching, so that there is a problem in the communication volume. In addition, data generated in searching has the same value for the same character. Thus, there is a problem that one who has storage encrypted tags (for example, a server) is capable of frequency analysis.

Non-Patent Literature 3 and Non-Patent Literature 4 disclose similarity searchable encryption techniques including partial match searching. These techniques allow more flexible searching than partial match searching. However, there is a problem that the sizes of both a storage encrypted tag and a search encrypted tag are large.

Therefore, it is an object of the present invention to provide a searchable encryption technique with partial matching while ensuring high security so as to be resistant to an attack such as frequency analysis on storage encrypted tags and search encrypted tags, and reducing the data size and the communication volume.

Solution to Problem

An encryption device according to the present invention includes: a data partition unit to partition data to be searched into a plurality of pieces of element data; and an encryption unit to encrypt each piece of element data of the plurality of pieces of element data with a random number by a cryptographic mode capable of searchable encryption.

Advantageous Effects of Invention

According to the present invention, data to be searched is partitioned and then encrypted using random numbers by a cryptographic mode capable of searchable encryption. Using the random numbers makes it impossible, against a frequency analysis attack, to compare ciphertexts which are data to be searched. For this reason, security can be enhanced. Since the data is partitioned, partial match searching while the data remains encrypted can be achieved.

BRIEF DESCRIPTION OF DRAWINGS

FIG. 11 is a diagram of the first embodiment and is a diagram illustrating hardware resources of the key generation device, the registration device, and so on;

FIG. 12 is a diagram of the first embodiment and is another diagram illustrating hardware resources of the key generation device, the registration device, and so on;

DESCRIPTION OF EMBODIMENTS

Embodiments of the present invention will be described hereinafter with reference to the drawings. Throughout the drawings, like or corresponding parts are denoted by like reference sings. In the description of the embodiments, the description of like or corresponding parts will be omitted or simplified as appropriate.

First Embodiment

In this embodiment, a highly secure and efficient searchable encryption technique with partial matching will be disclosed.

An overview of this embodiment will be described below.

Figure 1:
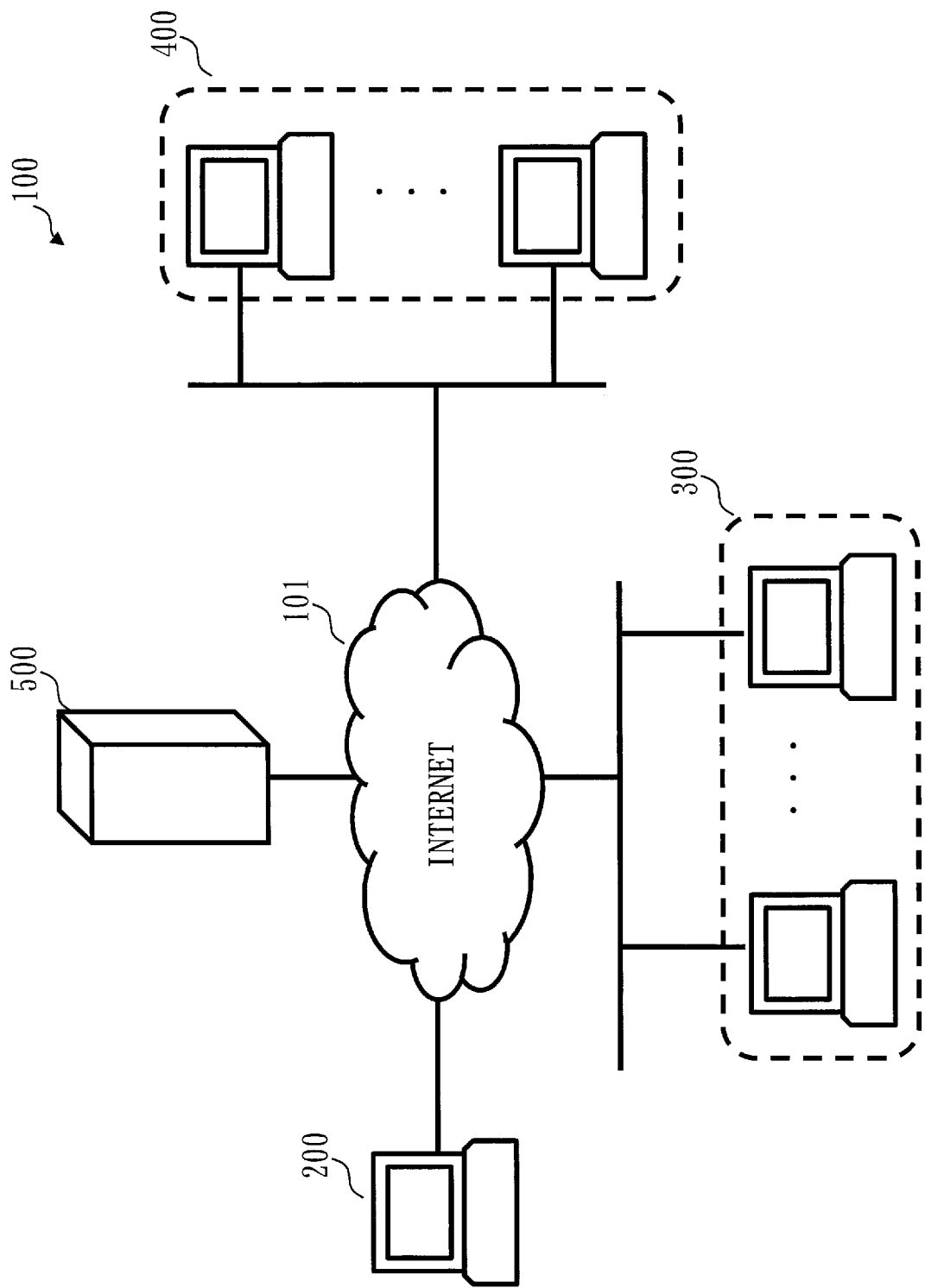
FIG. 1 is a diagram of a first embodiment and is a block diagram of a searchable encryption system.

FIG. 1 is a block diagram illustrating a configuration of a searchable encryption system 100 according to this embodiment. As illustrated in FIG. 1, the searchable encryption system 100 includes a key generation device 200, a plurality of registration devices 300, a plurality of search devices 400, and a management device 500. The registration device 300 is an encryption device. The searchable encryption system 100 may include a plurality of key generation devices 200. The searchable encryption system 100 may include only one registration device 300. The searchable encryption system 100 may include only one search device 400. The searchable encryption system 100 may include a plurality of management devices 500.

The searchable encryption system 100 may be installed within a local area network (LAN) provided in the same company, instead of being connected with each of the key generation device 200, the plurality of registration devices 300, the plurality of search devices 400, and the management device 500 via Internet 101.

The Internet 101 is a communication channel connecting the key generation device 200, the plurality of registration devices 300, the plurality of search devices 400, and the management device 500. The Internet 101 is an example of a network. In place of the Internet 101, a network of another type may be used.

The key generation device 200 creates a key to be used for encryption, and transmits the key via the Internet 101 to the plurality of registration devices 300 and the plurality of search devices 400. The key may be transmitted directly to the plurality of registration devices 300 and the plurality of search devices 400 by mail or the like, instead of via the Internet 101.

The registration device 300 is a personal computer, for example. The registration device 300 is a computer that operates as a registration terminal to register storage encrypted data in the management device 500. The storage encrypted data herein is $C_1^{\rightarrow}$, $C_2^{\rightarrow}$, and the like in $C(D_{(j)})=\{C_1^{\rightarrow}, C_2^{\rightarrow}, \ldots, C_L^{\rightarrow}\}$ to be described later.

The registration device 300 functions as an encryption device and a registration device. That is, the registration device 300 generates storage encrypted data, and requests the management device 500 to store the storage encrypted data.

The registration device 300 functions as a deletion request device. That is, the registration device 300 requests the management device 500 to delete the storage encrypted data that has been stored.

The search device 400 is a personal computer, for example. The search device 400 transmits search encrypted data to the management device 500, and then receives an encrypted search result from the management device 500 and outputs the encrypted search result.

The search device 400 functions as a search request device. That is, the search device 400 transmits the search encrypted data to the management device 500, and requests matching of the search encrypted data against the storage encrypted data.

The search device 400 functions as an output device. That is, the search device 400 outputs a search result returned from the management device 500.

The management device 500 is a device having a high-capacity recording medium to store the storage encrypted data created by the registration device 300. The management device 500 functions as a storage device. That is, when being requested by the registration device 300 to store the storage encrypted data, the management device 500 stores the storage encrypted data. The management device 500 functions as a search device. That is, when a search is requested by the search device 400, the management device 500 matches the search encrypted data against the storage encrypted data, and transmits a search result to the search device 400. The management device 500 functions as a deletion device. That is, when requested by the registration device 300 to delete the storage encrypted data, the management device 500 deletes the storage encrypted data that has been stored. Any combination of the key generation device 200, the registration device 300, and the search device 400 may be included together in the same personal computer. Both the storage encrypted data and the search encrypted data have been encrypted. It is difficult for those without the key other than the registration device 300 and the search device 400 to obtain useful information from the storage encrypted data and the search encrypted data.

<*Description of Configuration*>

Configurations of the key generation device 200, the registration device 300, the search device 400, and the management device 500 will be described sequentially with reference to FIG. 2 to FIG. 5. FIG. 2 to FIG. 5 are block diagrams illustrating the configurations of the key generation device 200, the registration device 300, the search device 400, and the management device 500, each of which is a computer.

Figure 11:
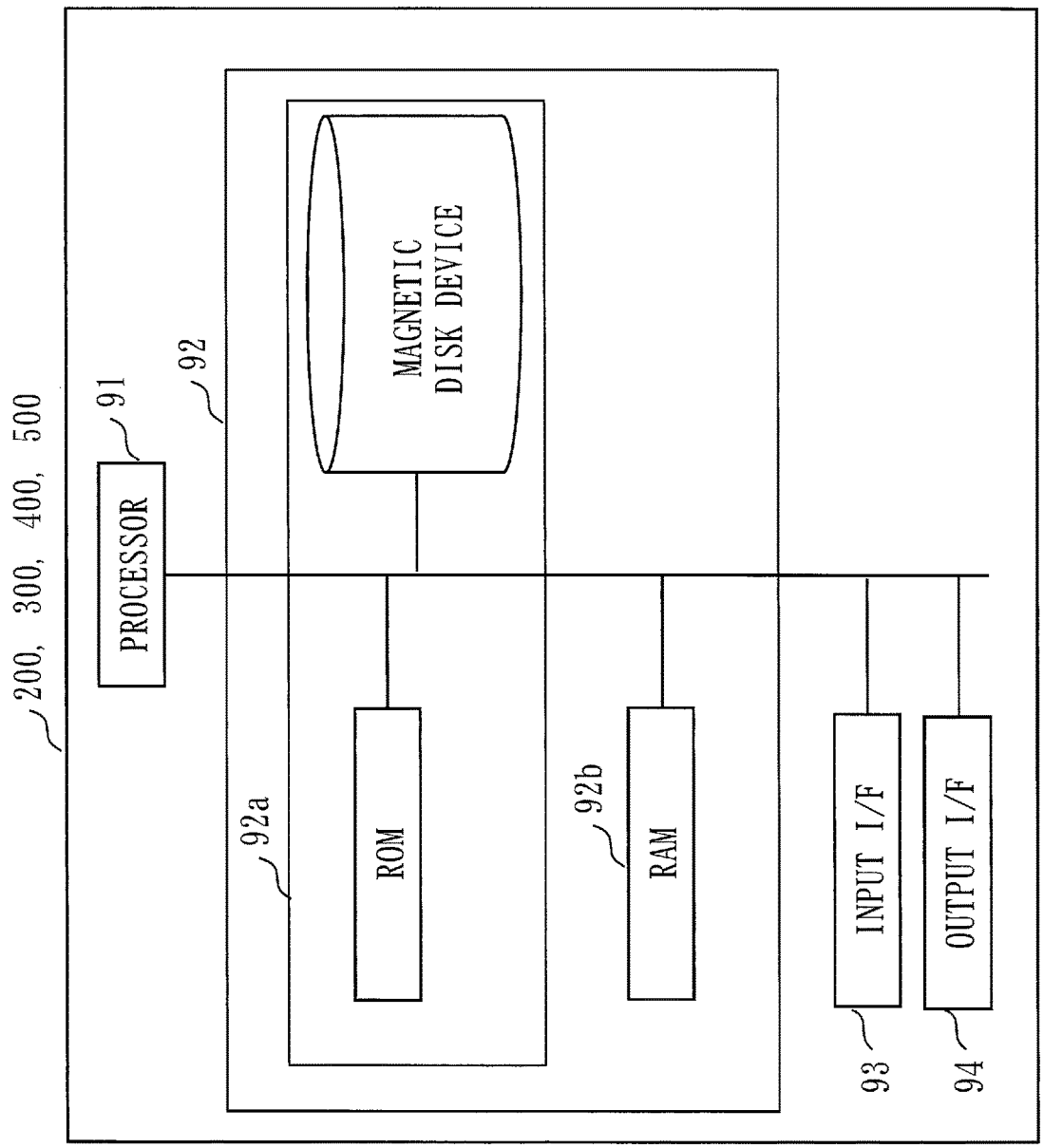
Figure 12:
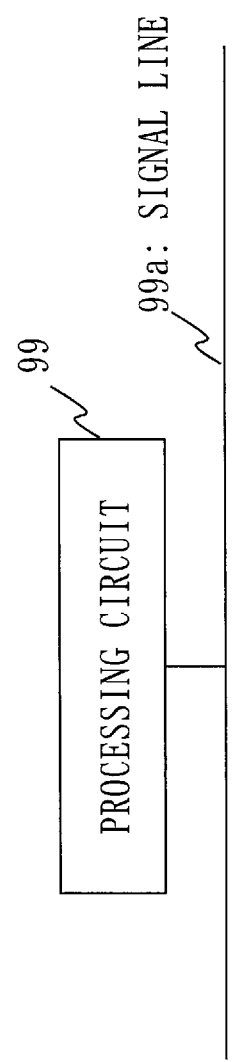

FIG. 11 is a diagram illustrating a hardware configuration of the key generation device 200 to the management device 500. FIG. 12 is another diagram illustrating a hardware configuration of the key generation device 200 to the management device 500.

In this embodiment, the key generation device 200, the registration device 300, the search device 400, and the management device 500 are computers. The key generation device 200 and the like are each provided with hardware such as a processor 91, a memory device 92, an input interface 93, and an output interface 94. The input interface 93 and the output interface 94 will be described hereinafter as the input I/F 93 and the output I/F 94, respectively. FIG. 2 to FIG. 5 illustrate relations between each functional unit and the hardware. In FIG. 2 to FIG. 5, a ". . . unit" indicated as the processor 91 is implemented by software. That is, the ". . . unit" indicated as the processor 91 is implemented by the processor 91 executing the software.

Figure 3:
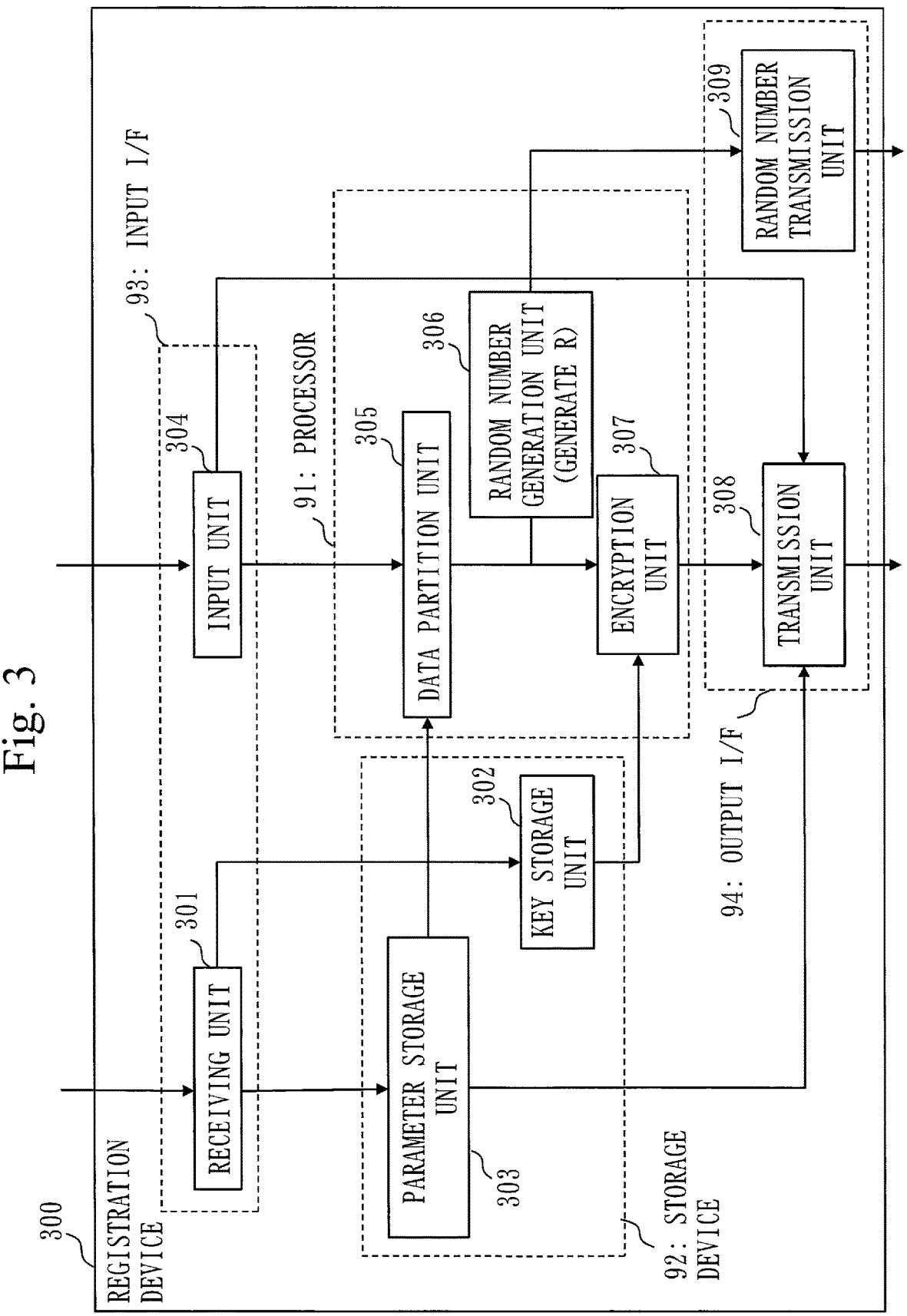
FIG. 3 is a diagram of the first embodiment and is a block diagram of a registration device.
Figure 4:
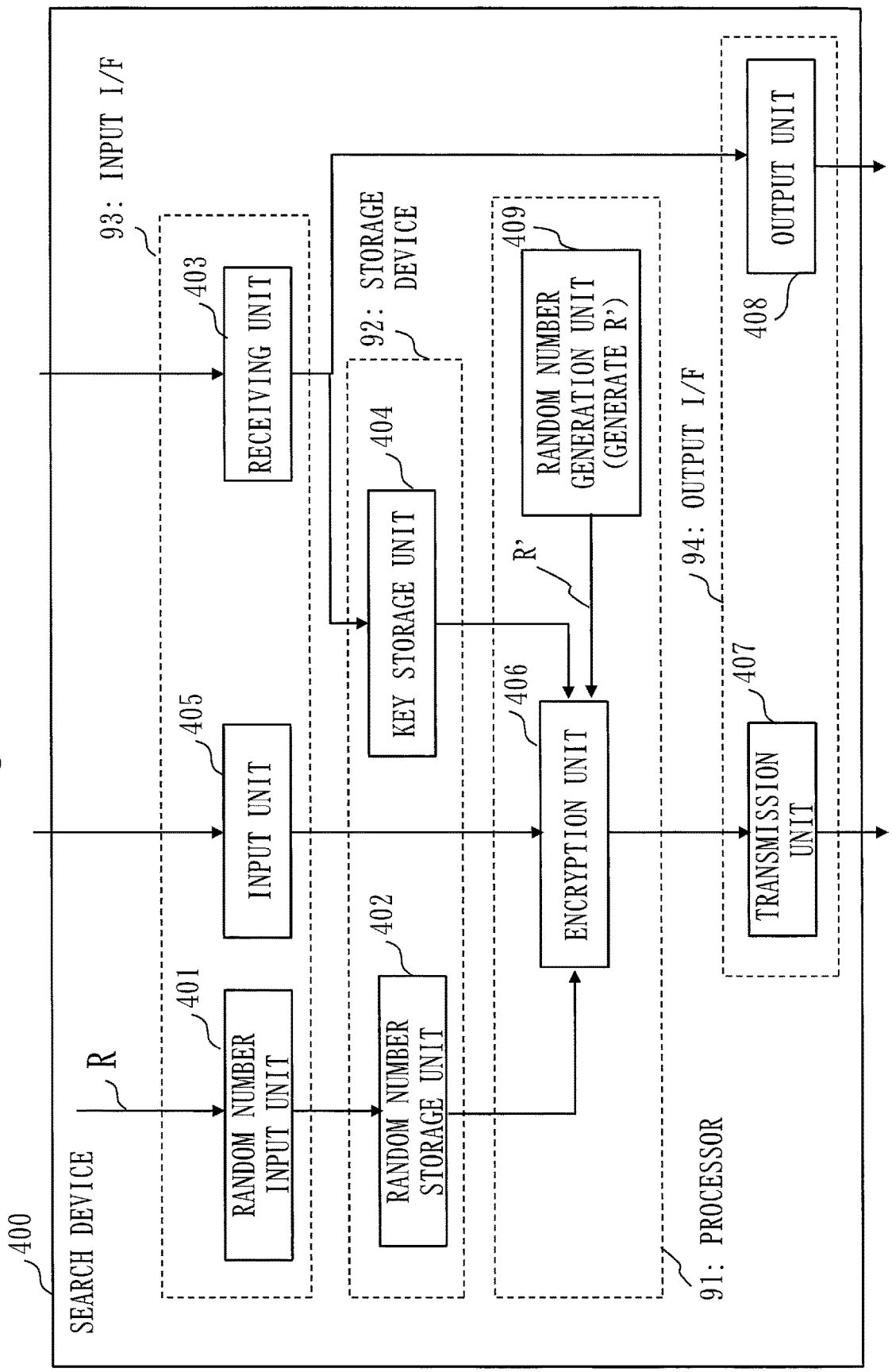
FIG. 4 is a diagram of the first embodiment and is a block diagram of a search device.
Figure 5:
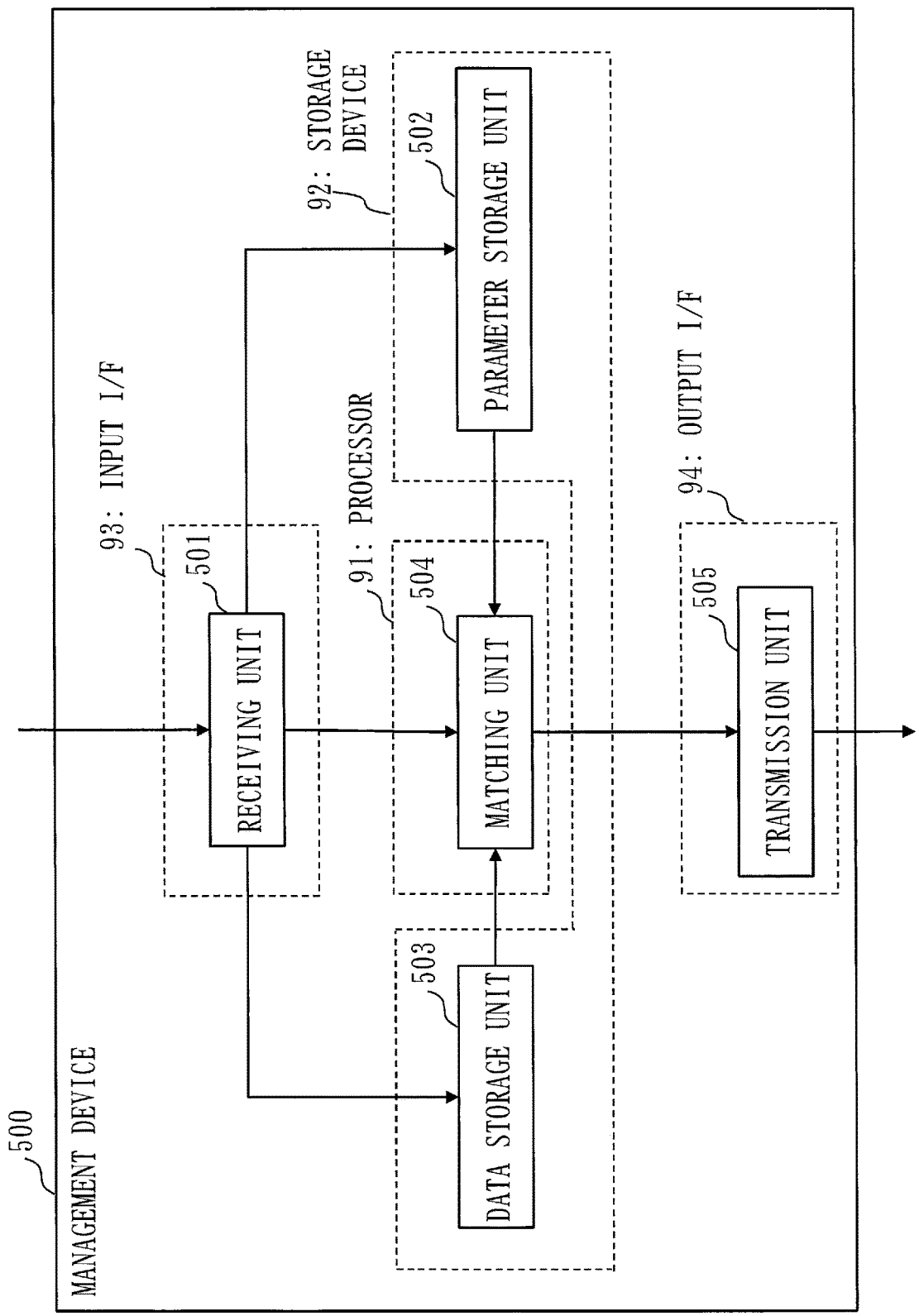
FIG. 5 is a diagram of the first embodiment and is a block diagram of a management device.

A ". . . storage unit" in FIG. 3 to FIG. 5 is implemented by the memory device 92.

The processor 91 is connected with other pieces of the hardware via a signal line, and controls these other pieces of the hardware. The processor 91 is an integrated circuit (IC) that performs processing. The processor 91 is specifically a central processing unit (CPU).

The memory device 92 includes an auxiliary memory device 92a and a memory 92b. The auxiliary memory device 92a is specifically a read-only memory (ROM), a flash memory, or a hard disk drive (HDD). The memory 92b is specifically a random access memory (RAM).

The input I/F 93 is a port to which a signal is input. The input I/F 93 may be a port that is connected with an input device such as a mouse, a keyboard, or a touch panel. The input I/F 93 is specifically a Universal Serial Bus (USB) terminal. The input I/F 93 may be a port that is connected with a local area network (LAN).

The output I/F 94 is a port which outputs a signal. The output I/F 94 may be a USB terminal.

The auxiliary memory device 92a stores a program for implementing the function of the ". . . unit" indicated as the processor 91. This program is loaded into the memory 92b, to be read into the processor 91 and executed by the processor 91. The auxiliary memory device 92a also stores an operating system (OS). At least a part of the OS is loaded into the memory 92b, and the processor 91 executes the program for implementing the function of the "unit" indicated as the processor 91 while executing the OS.

Each of the key generation device 200, the registration device 300, the search device 400, and the management device 500 may be provided with only one processor 91, or may be provided with a plurality of processors 91. The plurality of processors 91 may cooperate to execute the program for implementing the function of the "unit".

Information, data, a signal value, and a variable value that indicate results of processing by the function of the "unit" indicated as the processor 91 are stored in the auxiliary memory device 92a, the memory 92b, or a register or a cache memory in the processor 91.

The program for implementing the function of the "unit" indicated as the processor 91 may be stored in a portable recording medium, such as a magnetic disk, a flexible disk, an optical disk, a compact disk, or a digital versatile disc (DVD).

FIG. 12 will be described. In this embodiment, the function of the "unit" indicated as the processor 91 is implemented by software. As a modification example, the function of the "unit" indicated as the processor 91 may be implemented by hardware. That is, the above-mentioned function of the "unit" indicated as the processor 91 and function of the ". . . storage unit" are implemented by a processing circuit 99. The processing circuit 99 is connected to a signal line 99a. The processing circuit 99 is a dedicated electronic circuit to implement the function of the "unit" indicated as the processor 91 and the function of the ". . . storage unit". The processing circuit 99 is specifically a single circuit, a composite circuit, a programmed processor, a parallel-programmed processor, a logic IC, a gate array (GA), an application specific integrated circuit (ASIC), or a field-programmable gate array (FPGA).

The function of the "unit" indicated as the processor 91 may be implemented by a single processing circuit 99 or may be distributed among and implemented by a plurality of processing circuits 99.

As another modification example, the devices illustrated in FIG. 2 to FIG. 5 may be implemented by a combination of software and hardware. That is, some functions of the devices illustrated in FIG. 2 to FIG. 5 may be implemented by dedicated hardware, and the remaining functions may be implemented by software.

The processor 91, the memory device 92, and the processing circuit 99 will be collectively referred to as "processing circuitry". That is, the function of the "unit" indicated as the processor 91 and the ". . . storage unit" in FIG. 2 to FIG. 5 are implemented by the processing circuitry.

The "unit" indicated as the processor 91 may be interpreted as a "step" or a "procedure" or a "process". The function of the "unit" indicated as the processor 91 may be implemented by firmware.

Figure 2:
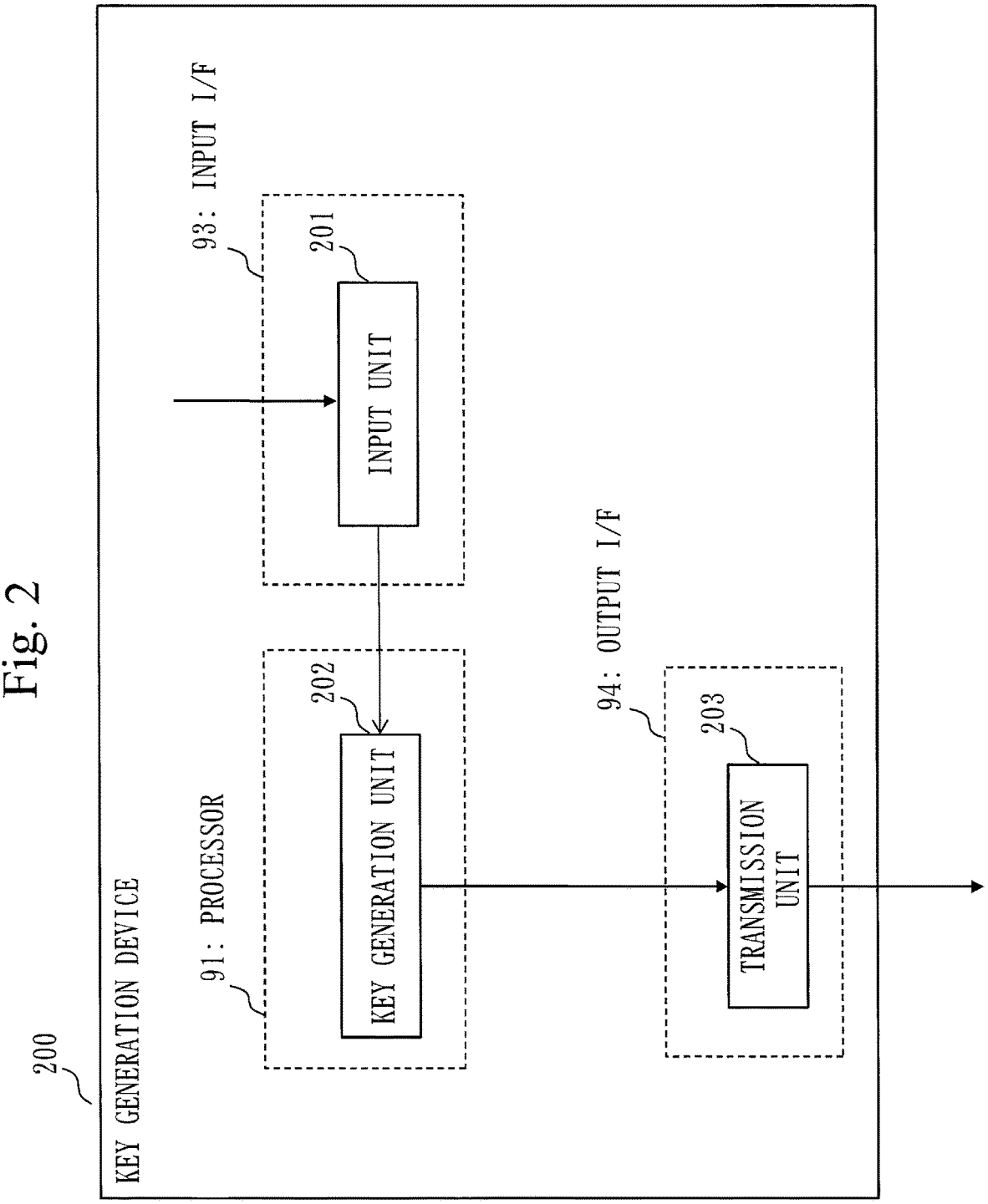
FIG. 2 is a diagram of the first embodiment and is a block diagram of a key generation device.

FIG. 2 is a block diagram illustrating the configuration of the key generation device 200.

As illustrated in FIG. 2, the key generation device 200 includes an input unit 201, a key generation unit 202, and a transmission unit 203. Although not illustrated, the key generation device 200 includes a recording medium to store data used in each unit of the key generation device 200.

The input unit 201 receives as input a key bit length used in this system, the maximum number of characters L used in searching, and the like. Using a key bit length $L_{bit}$ that has been input, the key generation unit 202 generates a key K for encrypting and decrypting data and a key K' used in searching. The key K and the key K' are secret information to be stored in the registration device 300, the search device 400, and the management device 500, so that they are generated strictly. The description is given herein using a common-key cryptographic technique, but a public-key cryptographic technique may also be used. In the following description, the key K and key K' are used, but the key K' may be omitted when it is not necessary. That is, in the following description, E(K', *) will be introduced, and E(K', *) means that data "*" is encrypted with the key K'. When encryption other than E(K', *) is employed, the key K' is not necessary. This is what is meant by when the key K' is not necessary.

When the key K or the key K' is used in the following description, it is assumed that the key K or the key K' has been transmitted from the key generation device 200.

The transmission unit 203 transmits the key K generated by the key generation unit 202 to the registration device 300 and the search device 400, and transmits the key K' to the search device 400 and the management device 500. The transmission unit 203 transmits, as a parameter L, the maximum number of characters L input to the input unit 201 to the registration device 300 and the management device 500.

FIG. 3 is a block diagram illustrating the configuration of the registration device 300. As illustrated in FIG. 3, the registration device 300 includes a receiving unit 301, a key storage unit 302, a parameter storage unit 303, an input unit 304, a data partition unit 305, a random number generation unit 306, an encryption unit 307, a transmission unit 308, and a random number transmission unit 309. Although not illustrated, the registration device 300 includes a recording medium to store data used in each unit of the registration device 300.

The receiving unit 301 receives the key K and the parameter L transmitted from the key generation device 200. The key storage unit 302 stores the key K received from the receiving unit 301. The parameter storage unit 303 stores the parameter L received from the receiving unit 301.

The input unit 304 receives storage data and a data name of the storage data which are input by a data registrant. In this embodiment, the storage data will be described as storage data D and the data name will be described as ID(D).

If no data name is input by the data registrant, the input unit 304 may assign a random number to the data name ID(D) of the input storage data D, or may assign an integer value greater than 0 sequentially such that it does not overlap with data names of other pieces of storage data.

The input unit 304 receives from the data registrant a deletion data name concerning a storage encrypted data set to be deleted. The deletion data name may be any name as long as it allows the storage data to be identified, such as a data name that has been input at registration, a time of the registration, a name of the data registrant, or the like, for example.

The data partition unit 305 reads out the parameter L from the parameter storage unit 303, and partitions the storage data D received from the input unit 304 as $(w_1, \ldots, w_L)$. At this time, the number of partitions may be smaller than L. Each $w_i$ ($1 \leq i \leq L$) may be obtained by sequentially partitioning the data into one-character pieces or plural-character pieces, or may be obtained by partitioning the data on a per-word basis.

The parameter storage unit 303 stores a security parameter $\lambda$. The random number generation unit 306 generates one random number R. The size of R is not particularly specified, but it is desirable that the size be large enough in accordance with the size of the security parameter $\lambda$ stored in the parameter storage unit 303.

The encryption unit 307 reads out the key K from the key storage unit 302, and generates a ciphertext C, as described below, using the random number R generated by the random number generation unit 306.

For characters $w_i, \ldots, w_L$, a set A as indicated below is generated from the partitioned data $(w_1, \ldots, w_L)$ received from the data partition unit 305.

$$A = \{A_1, A_2, \ldots, A_L\}$$

The set A may be hereinafter referred to as a partial character string set.

Using the set A, the encryption unit 307 generates a storage encrypted data set (ID(D), C(D)), as will be described in detail in describing the operation of the registration device.

The transmission unit 308 transmits the storage encrypted data set (ID(D), C(D)) received from the encryption unit 307 to the management device 500. The random number transmission unit 309 transmits the random number R received from the random number generation unit 306 to the search device 400. This random number R is a random number $R_{(j)}$ to be described later which is managed by the search device 400. The random number $R_{(j)}$ may be denoted as $R_j$.

FIG. 4 is a block diagram illustrating the configuration of the search device 400. As illustrated in FIG. 4, the search device 400 includes a random number input unit 401, a random number storage unit 402, a receiving unit 403, a key storage unit 404, an input unit 405, an encryption unit 406, a transmission unit 407, an output unit 408, and a random number generation unit 409. Although not illustrated, the search device 400 includes a recording medium to store data used in each unit of the search device 400.

(1) The random number input unit 401 receives the random number R transmitted from the registration device 300.

(2) The random number storage unit 402 stores the random number R input to the random number input unit 401 together with an identifier j indicating the sequence of storage. That is, a plurality of random numbers R that have been input to the random number input unit 401 are stored in the random number storage unit 402, each as a pair $(j, R_j)$. The random number storage unit 402 holds $(j, R_j)$ as a list.

(3) The receiving unit 403 receives the key K and the key K' transmitted from the key generation device 200, or a search result transmitted from the management device 500.

(4) The key storage unit 404 stores the key K received from the receiving unit 403.

(5) The input unit 405 receives search data S input by a data searcher. Together with the search data S, the input unit 405 may receive from the data searcher a plurality of storage data names that specify storage encrypted data sets (ID(D), C(D)) to be searched with the search data S.

(6) The encryption unit 406 reads out the key K and the key K' from the key storage unit 404, and generates a ciphertext t as indicated below using the key K on the search data S received from the input unit 405.

The following is an outline, which will be described in detail in describing the operation of the search device 400.

(1) First, the encryption unit 406 partitions the search data S as $$S: (s_1, \ldots, s_k).$$

Note that partitioning is not necessarily required.

(2) Next, the encryption unit 406 reads out $(j, R_j)$ from the random number storage unit 402 and generates $$u=(u_1, \ldots, u_k).$$

That is, the random number storage unit 402 holds, as a list, M pairs of values $$(1, R_1), (2, R_2), \ldots, (M, R_M).$$

M is equal to the number of storage encrypted data sets (ID(D), C(D)) registered by the registration device 300. Using $(j, R_j)$ read out by the random number storage unit 402, each ciphertext is generated by the encryption unit 406 from $$u_i = E(K, s_i <+> u_{i-1}).$$

Note that <+> is a symbol that denotes, for convenience, an exclusive OR operation.

Since $R_j$ is being considered, it is assumed that $u_0 = R_j$.

Next, one generation random number R' is selected. The generation random number R' has been generated by the random number generation unit 409.

Then, $t_j = E(K', R', u_{1(j)}, \ldots, u_{k(j)})$. Note that E is an encryption function.

It may also be $t_j = E(K', R', u_{k(j)})$. The encryption unit 406 executes the above for every $(j, R_j)$ received from the random number storage unit 402. When there are M pairs of $(j, R_j)$, M pieces of $t_j$ are generated to correspond with the number of pairs. All the M pieces of $t_j$ will be hereinafter referred to as search encrypted data and described as the search encrypted data $\vec{T} = (t_{(1)}, \ldots, t_{(M)})$.

The transmission unit 407 transmits the search encrypted data $\vec{T}$ and the generation random number R' received from the encryption unit 406 to the management device 500. If a storage data name has also been input by the data searcher together with the search data, both the search encrypted data and the storage data name are transmitted to the management device 500.

Based on a search result received from the receiving unit 403, the output unit 408 outputs the search result to the data searcher. If the search result has been encrypted, the search result is decrypted with the key K stored in the key storage unit 404 or the like and then is output.

FIG. 5 is a block diagram illustrating the configuration of the management device 500. As illustrated in FIG. 5, the management device 500 includes a receiving unit 501, a parameter storage unit 502, a data storage unit 503, a matching unit 504, and a transmission unit 505. Although not illustrated, the management device 500 includes a recording medium to store data used in each unit of the management device 500.

(1) The receiving unit 501 receives the parameter L transmitted from the key generation device 200, the storage encrypted data set (ID(D), C(D)) and the deletion data name transmitted from the registration device 300, and the search encrypted data $\vec{T}$, the random number R', and the storage data name transmitted from the search device 400.

(2) The parameter storage unit 502 stores the parameter L received from the receiving unit 501.

(3) The data storage unit 503 stores the storage encrypted data set (ID(D), C(D)) received from the receiving unit 501. If necessary, a date and time of transmission may also be stored at the same time. The data storage unit 503 deletes the stored storage encrypted data set, based on the received deletion data name The matching unit 504 generates an empty set I concerning a search result, reads out all the storage encrypted data sets (ID(D), C(D)) from the data storage unit 503, and performs matching based on the search encrypted data $\vec{T} = (t_{(1)}, \ldots, t_{(M)})$ received from the receiving unit 501. The matching unit 504 performs a matching process, or generates a search result. The detailed process will be described with the operation of the management device 500.

The transmission unit 505 transmits a search result R received from the matching unit 504 to the search device 400.

<*Description of Operation*>

The operation of the searchable encryption system 100, which is equivalent to a search method according to this embodiment, will be described hereinafter.

Figure 6:
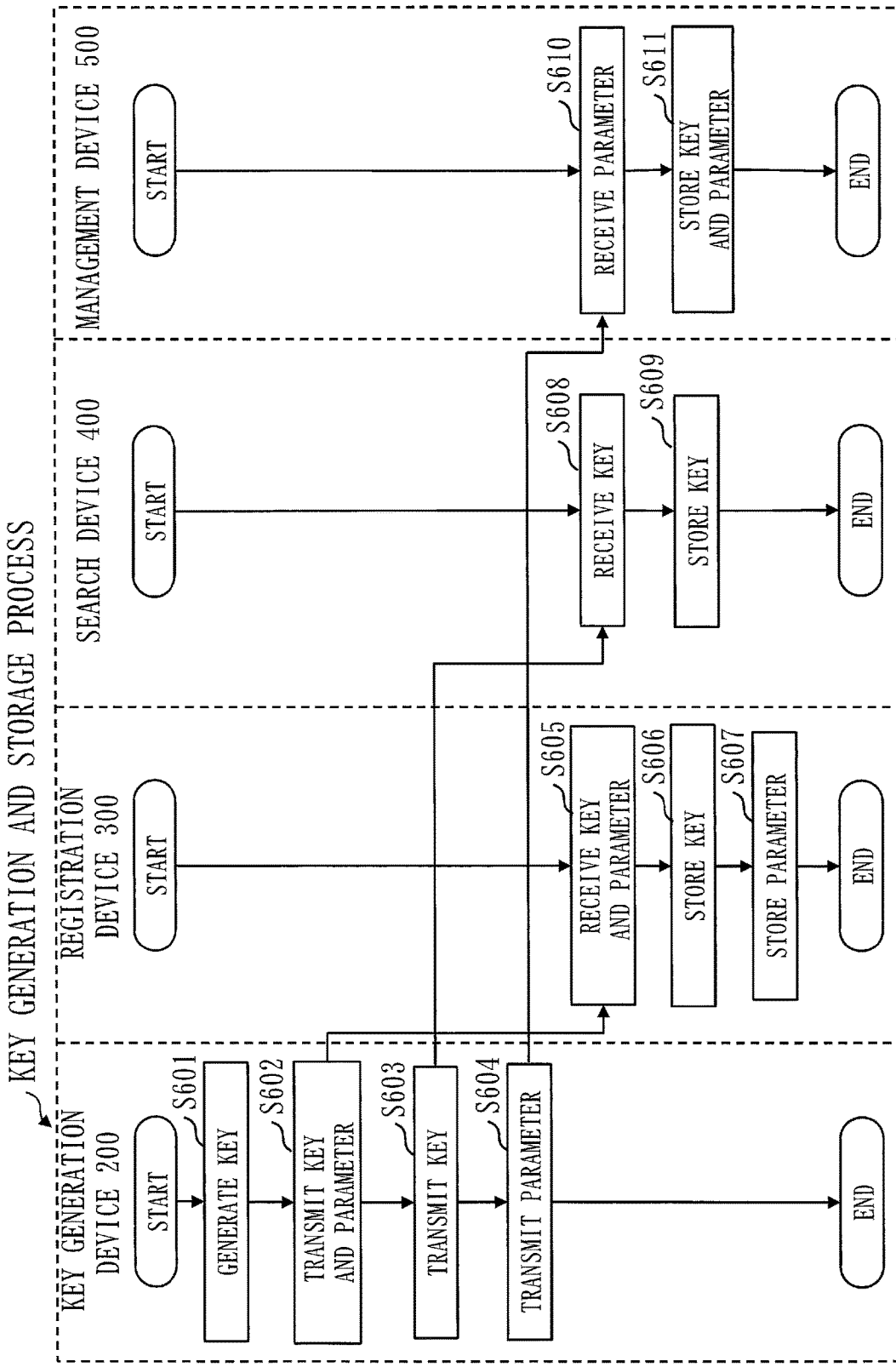
FIG. 6 is a diagram of the first embodiment and is a flowchart illustrating a key generation and storage process of the searchable encryption system.

FIG. 6 is a flowchart illustrating a key generation and storage process of the searchable encryption system 100.

S601 to S611 of FIG. 6 are a process executed by the key generation device 200, the registration device 300, the search device 400, and the management device 500. S601 to S604 are executed by the key generation device 200. S605 to S607 are executed by the registration device 300. S608 to S609 are executed by the search device 400. S610 to S611 are executed by the management device 500.

(Key Generation Device 200)

In S601, the key generation unit 202 generates a key K and a key K' used for encrypting data, using a key bit length $L_{bit}$ input to the input unit 201.

A parameter L input to the input unit 201 is the maximum number of partitions for partitioning the storage data D.

This embodiment is described using the common-key cryptographic technique, but the public-key cryptographic technique may also be used. In that case, with regard to the key K, the key generation unit 202 may set a pair of a public key PK and a secret key SK as the key K, and with regard to the key K', set a pair of a public key PK' and a secret key SK' as the key K', and perform the process to be described below in the same way.

In S602, the transmission unit 203 transmits the parameter L input to the input unit 201 and the key K generated in S601 to the registration device 300.

In S603, the transmission unit 203 transmits the key K generated in S601 to the search device 400.

In S604, the transmission unit 203 transmits the parameter L input to the input unit 201 to the management device 500.

(Registration Device 300)

In S605, the receiving unit 301 receives the key K and the parameter L transmitted in S602.

In S606, the key storage unit 302 stores the key K received in S605 in a storage medium.

In S607, the parameter storage unit 303 stores the parameter L received in S605 in the storage medium.

(Search Device 400)

In S608, the receiving unit 403 receives the key K and the key K' transmitted in S603.

In S609, the key storage unit 404 stores the key K and the key K' received in S608 in a storage medium.

(Management Device 500)

In S610, the receiving unit 501 receives the key K' and the parameter L transmitted in S604.

In S611, the parameter storage unit 502 stores the key K' and the parameter L received in S610 in a storage medium.

S611 completes the key generation and storage process of the searchable encryption system 100.

The key K and the key K' are secret information. For this reason, the key storage unit 302 of the registration device 300 and the key storage unit 404 of the search device 400 need to store the key K and the key K' strictly to prevent them from being leaked to the outside.

Figure 7:
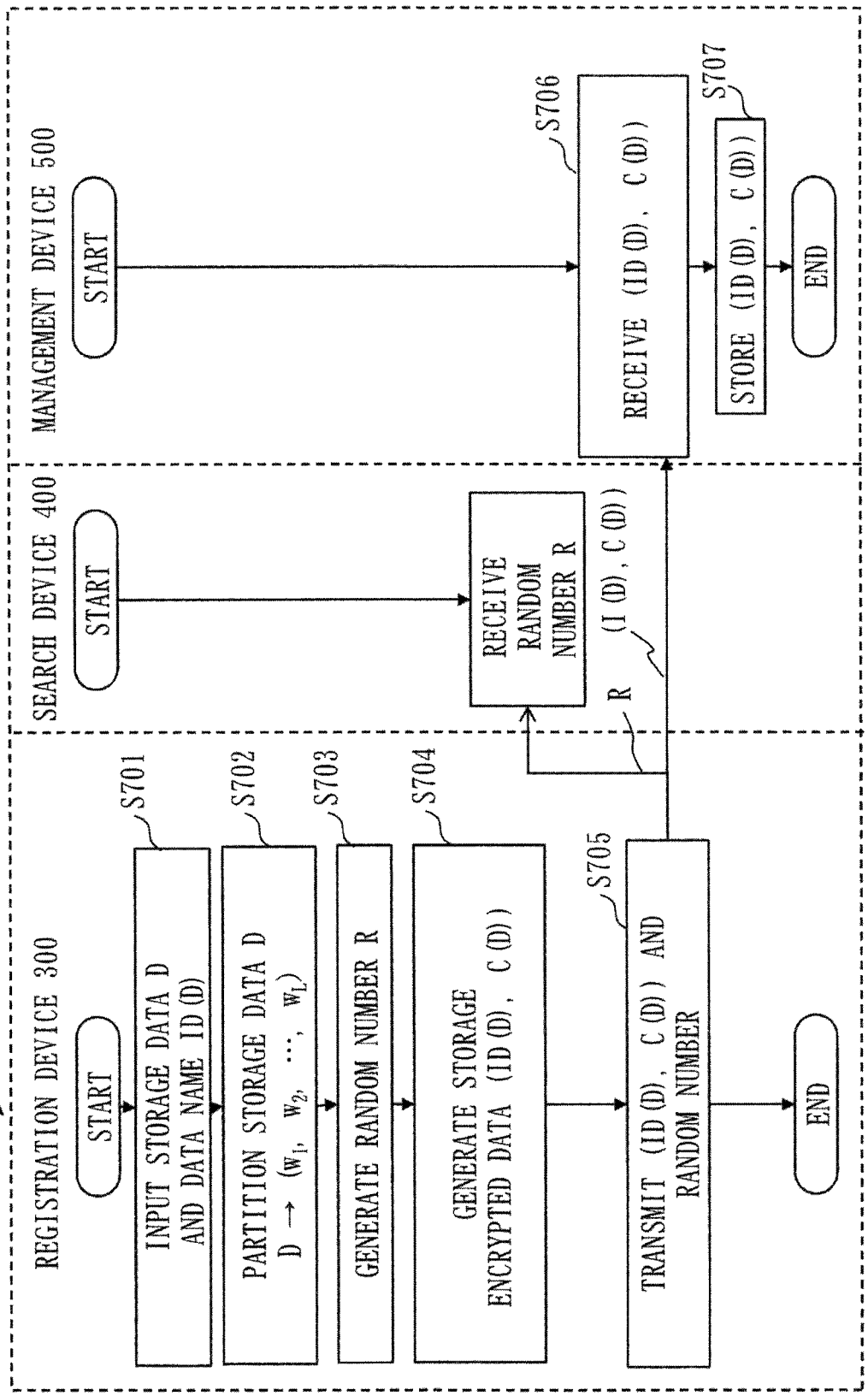
FIG. 7 is a diagram of the first embodiment and is a flowchart illustrating a data registration process of the searchable encryption system.

FIG. 7 is a flowchart illustrating a registration process of the searchable encryption system 100. S701 to S707 of FIG. 7 are a process executed by the registration device 300 and the management device 500. S701 to S705 are a process executed by the registration device 300. S706 to S707 are a process executed by the management device 500.

(Registration Device 300)

In S701, the input unit 304 receives storage data D and a data name ID(D) that are input by a data registrant. If no data name is input by the data registrant, the input unit 304 may assign a random number to the data name ID(D) of the input storage data D, or may assign an integer value greater than 0 sequentially such that it does not overlap with data names of other pieces of storage data.

In S702, the data partition unit 305 partitions the storage data D which is data to be searched into a plurality of pieces of element data $w_i$.

Specifically, this is done as follows.

The data partition unit 305 reads out the parameter L from the parameter storage unit 303, and partitions the storage data D received from the data registrant in S701 into L pieces of element data $w_i$ (i=1, ..., L) as indicated by the parameter L, as $(w_1, \ldots, w_L)$.

When the number of partitions is defined as N, the number of partitions N may be a number equal to or smaller than L.

As described above, the storage data D has a data structure which can be partitioned sequentially from the front, and the data partition unit 305 partitions the storage data D sequentially from the front into a total of N pieces of the first to the Nth element data $w_i$.

(Specific Example)

A specific example will be described. When the parameter L=3, the data partition unit 305 may partition the storage data D into three pieces $(w_1, w_2, w_3)$, or may partition the storage data D into two pieces $(w_1, w_2)$. In this way, the number of partitions may be any number equal to or smaller than the parameter L.

The example of $(w_1, w_2, w_3)$ will be further described. As $w_1, w_2, w_3$, and the like, the data partition unit 305 may partition the storage data D sequentially into single-character pieces or plural-character pieces, or may partition the storage data D on a per-word basis.

In 703, the random number generation unit 306 generates one random number R.

In S704, the encryption unit 307 reads out the key K from the key storage unit 302, and generates a ciphertext C by a process 1 of generating a set A and a process 2 of generating $C_i^{\rightarrow}$ as described below, using the random number R generated in S703.

(Process 1: Generating a Set A)

In the following, one piece of storage data $D_{(j)}$ will be considered. The storage data $D_{(j)}$ is denoted as $D_{(1)}$, assuming j=1. In the following, j is a character that identifies the storage data D and is denoted as (j). A random number $R_{(j)}$ corresponding to the storage data $D_{(j)}$ is generated by the random number generation unit 306. It is assumed that the data partition unit 305 has partitioned the storage data $D_{(1)}$ into L pieces.

That is, the storage data $D_{(1)}$ is partitioned as $(w_1, w_2, w_3, \ldots, w_L)$.

The encryption unit 307 generates a set $A_{(1)}$ having, as elements, the following partial character string $A_i$ (i=1, 2, ..., L).

$$A = \{A_1, A_2, \ldots, A_L\}$$

$$A_i = (w_i, w_{i+1}, \ldots, w_L)$$

That is, $$A_1 = (w_1, w_2, \ldots, w_L),$$

$$A_2 = (w_2, w_3, \ldots, w_L),$$

..., $$A_L = (W_L).$$

(Process 2: Generating $C_i^{\rightarrow}$)

The encryption unit 307 generates $C_i = (c_{i,i}, \ldots, c_{i,L})$ for $A_i = (w_i, w_{i+1}, \ldots, w_L)$ (i=1, 2, ..., L).

Note that $C_i$ corresponds to $A_i$ and has L−i+1 elements.

In the following, $C_i$ will be denoted as $C_i^{\rightarrow}$ in vector representation in order to distinguish it from an element $c_{i,j}$ and the like.

That is, $C_i^{\rightarrow} = (c_{i,i}, \ldots, c_{i,L})$.

Each ciphertext c which is an element of $C_i^{\rightarrow}$ is generated by the following.

$$c_{i,j} = E(K, w_j <+> c_{i,j-1}) \quad \text{(Expression 1)}$$

$$c_{i,i} = R_{(j)} \quad \text{(Expression 2)}$$

Note that i corresponds to $A_i$, and that j of Expression 1 takes i to L.

Note that j of Expression 1 is different from (j) that identifies the storage data D.

Expression 1 and Expression 2 indicate a Cipher Block Chaining mode (CBC mode).

The meanings of the symbols in $E(K, w_j <+> c_{i,j-1})$ of (Expression 1) are as follows.

As described above, <+> denotes an exclusive OR operation.

Accordingly, $w_j <+> c_{i,j-1}$ denotes an exclusive OR operation on $w_j$ and $c_{i,j-1}$.

As mentioned above, E(K, *) means that * is encrypted with the key K.

With regard to the storage data $D_{(1)}$, the encryption unit 307 generates $C_i^{\rightarrow}$ for every $A_i$.

The above process is executed for every $A_i$.

A set including the entire $C_i^{\rightarrow}$ will be denoted as $C(D_{(j)})$. Since $C_i^{\rightarrow}$ corresponds to $A_i$, $$C(D_{(j)}) = \{C_1^{\rightarrow}, C_2^{\rightarrow}, \ldots, C_L^{\rightarrow}\}.$$

Note that E in $E(K, w_j <+> c_{i,j-1})$ is an encryption function. Examples of E include a common-key cryptographic scheme, a message authentication code, and a hash function.

The above process 1 and process 2 will be described using a specific example.

It is assumed that the storage data $D_{(1)}$ has been partitioned as $(w_1, w_2, w_3)$ by the data partition unit 305.

The following is all processed by the encryption unit 307.

The encryption unit 307 generates a set $A = \{A_1, A_2, A_3\}$.

In this case, $A_1 = (w_1, w_2, w_3)$, $A_2 = (w_2, w_3)$, and $A_3 = (w_3)$.

The encryption unit 307 generates $C_i^{\rightarrow}$ for $A_i$ (i=1, 2, 3).

$C_1^{\rightarrow}$, $C_2^{\rightarrow}$ and $C_3^{\rightarrow}$ correspond to $A_1$, $A_2$, and $A_3$, respectively.

The following $c_{1,1}$ is calculated by Expression 1.
Expression 1 indicates the CBC mode illustrated in FIG. 9.

Figure 9:
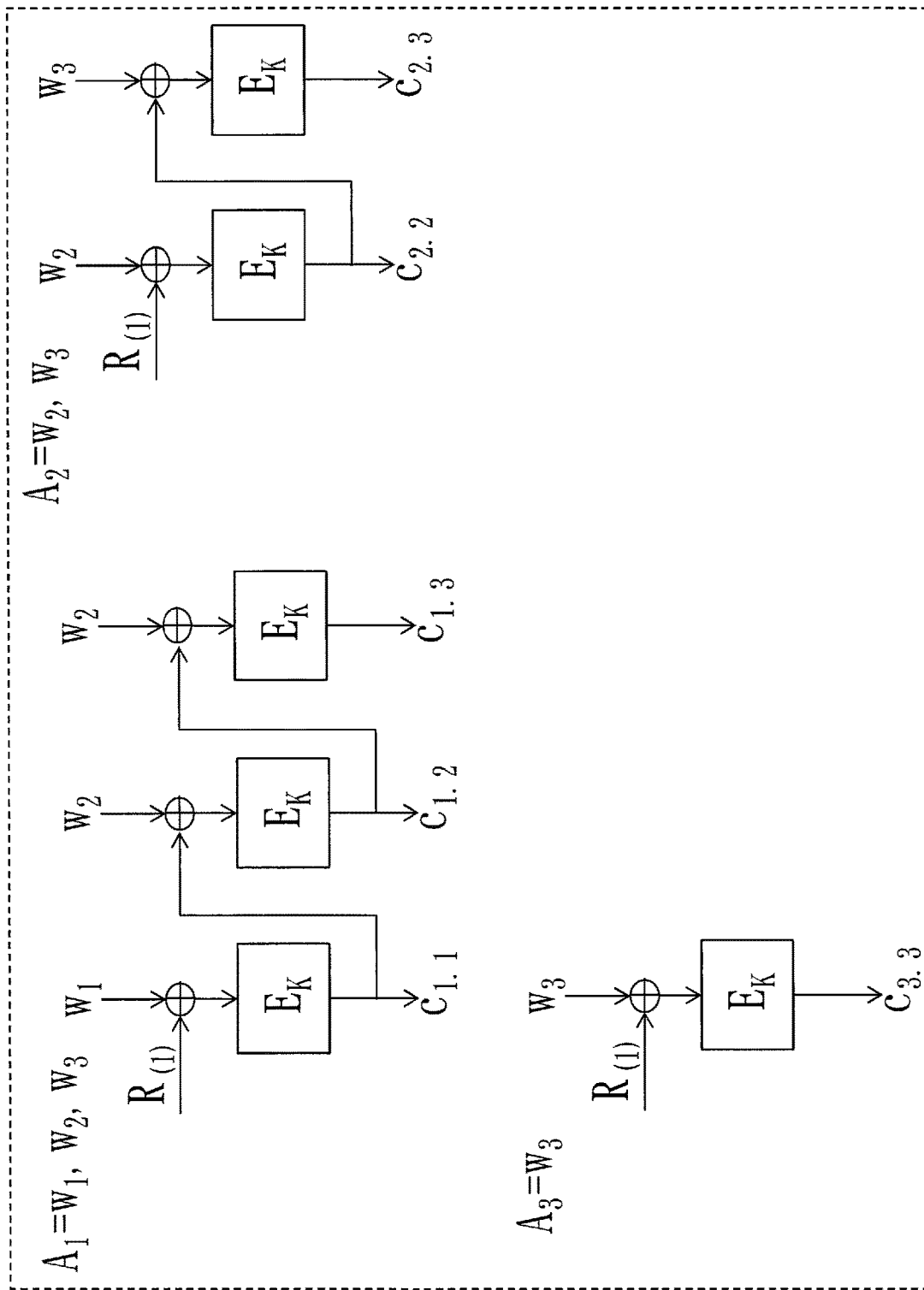
FIG. 9 is a diagram of the first embodiment and is a diagram explaining an encryption process by the registration device.

FIG. 9 illustrates $A_1$ to $A_3$ in the following case.

i=1: (corresponding to $A_1$)

$$\vec{C_1} = (c_{1,1}, c_{1,2}, c_{1,3})$$

$$c_{1,1} = E(K, w_1 <+> c_{1,0}) = E(K, w_1 <+> R_{(1)})$$

$$c_{1,2} = E(K, w_2 <+> c_{1,1}) = E(K, w_2 <+> E(K, w_1 <+> R_{(1)}))$$

$$c_{1,3} = E(K, w_3 <+> c_{1,2}) = E(K, w_3 <+> E(K, w_2 <+> E(K, w_1 <+> R_{(1)})))$$

i=2: (corresponding to $A_2$):

$$\vec{C_2} = (c_{2,2}, c_{2,3})$$

$$c_{2,2} = E(K, w_2 <+> c_{2,1}) = E(K, w_2 <+> R_{(1)})$$

$$c_{2,3} = E(K, w_3 <+> c_{2,2}) = E(K, w_3 <+> E(K, w_2 <+> R_{(1)}))$$

i=3: (corresponding to $A_3$):

$$\vec{C_3} = (c_{3,3}) = E(K, w_3 <+> c_{2,2}) = E(K, w_3 <+> R_{(1)})$$

With the above, $\vec{C_1}$, $\vec{C_2}$, and $\vec{C_3}$ are generated with regard to the set $A = \{A_1, A_2, A_L\}$.

Accordingly, $$C(D_{(1)}) = \{\vec{C_1}, \vec{C_2}, \vec{C_3}\}.$$

Note that $$\vec{C_1} = (c_{1,1}, c_{1,2}, c_{1,3}),$$

$$\vec{C_2} = (c_{2,2}, c_{2,3}), \text{ and}$$

$$\vec{C_3} = (c_{3,3}).$$

The values of $c_{1,1}$ and the like are according to $E(K, w_1 <+> R_{(1)})$ and the like above.

The above is the specific example of the process 1 and the process 2.

As illustrated in FIG. 9, the encryption unit 307 encrypts each piece of element data $w_i$ of a plurality of pieces of element data $w_i$ with the random number R by a cryptographic mode capable of searchable encryption. In FIG. 9, the cryptographic mode capable of searchable encryption is the CBC mode.

More specifically, using N pieces of partitioned element data, the encryption unit 307 generates N sets $A_i$ from a first set $A_1$ in which the first to Nth pieces of element data are sequentially arranged, a second set $A_2$ in which the second to Nth pieces of element data are sequentially arranged, thereafter sequentially to a set $A_{N-1}$ in which the N−1th to Nth pieces of element data are sequentially arranged, and a set $A_N$ composed of the Nth piece of element data. In the first embodiment, it is assumed that N=L, and in the specific example it is assumed that N=3.

Then, as illustrated in FIG. 9, the encryption unit 307 encrypts each piece of element data $w_i$ included in each set with the random number R by the CBC mode.

FIG. 9 illustrates the case of the first set $A_1$. The same process as that on the set $A_1$ is performed on every set $A_i$. As illustrated in FIG. 9, for each set of the first set $A_1$ to the Nth set $A_N$, the encryption unit 307 performs an exclusive OR operation on the random number R and the first piece of element data in the set in the first stage of the CBC mode, and in each of the second and subsequent stages of the CBC mode, performs an exclusive OR operation on the output value of the preceding stage and a piece of element data sequentially next after the piece of element data used in the exclusive OR operation in the preceding stage.

In S705, the random number transmission unit 309 transmits the storage encrypted data set (ID(D), C(D$_{(j)}$)) generated in S704 and the random number R$_{(j)}$ to the management device 500.

The random number transmission unit 309 also transmits the random number R$_{(j)}$ to the search device 400.

(Management Device 500)

In S706, the receiving unit 501 receives the storage encrypted data sets transmitted in S706.

In S707, the data storage unit 503 stores the storage encrypted data sets received in S706.

S707 completes the registration process of the searchable encryption system 100.

Figure 8:
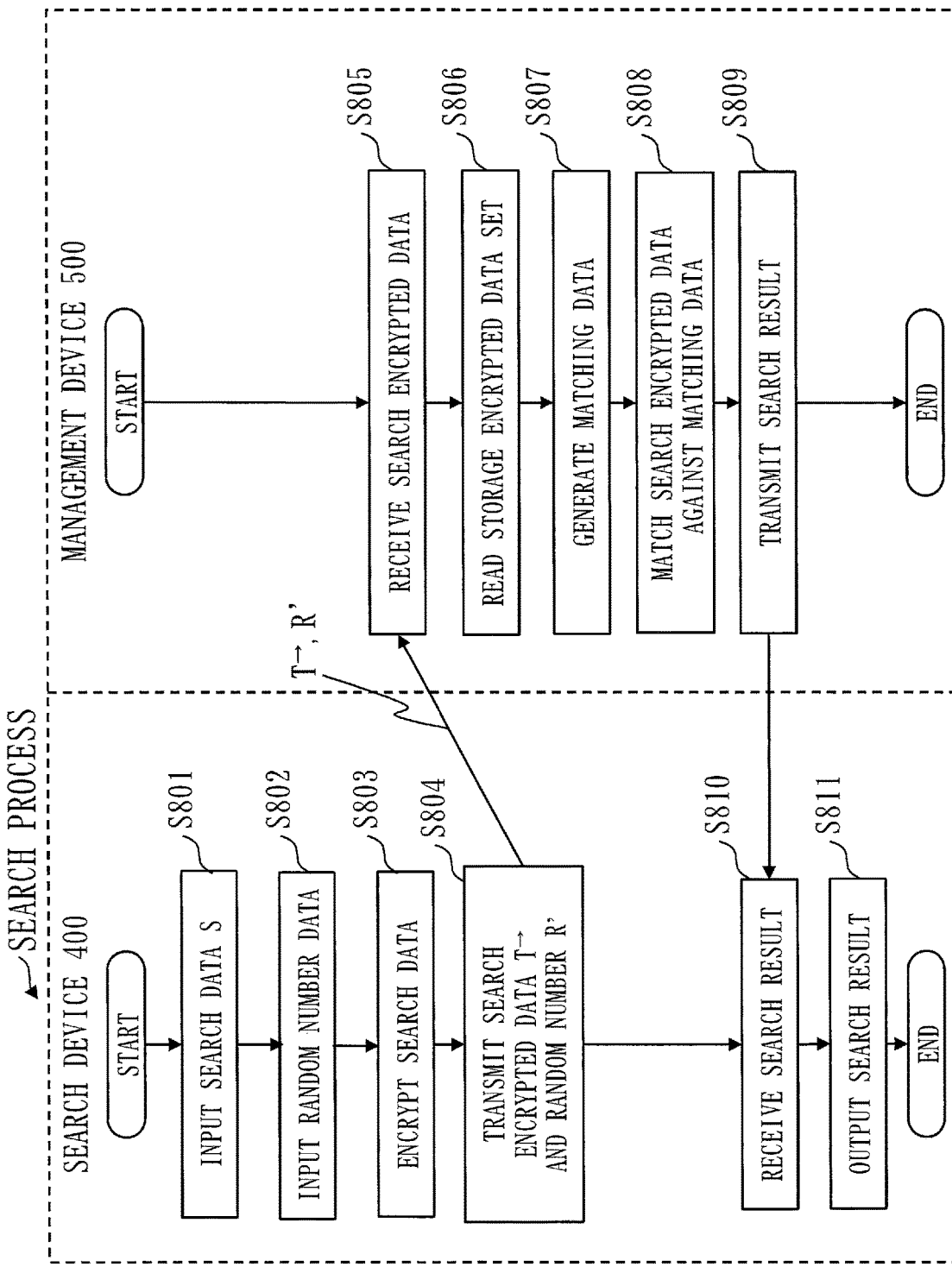
FIG. 8 is a diagram of the first embodiment and is a flowchart illustrating a data search process of the searchable encryption system.

FIG. 8 is a flowchart illustrating a search process of the searchable encryption system 100.

S801 to S810 of FIG. 8 are a process executed by the search device 400 and the management device 500.

S801 to S804 and S810 to S811 are a process executed by the search device 400, and S805 to S809 are a process executed by the management device 500.

In S801, the input unit 405 receives search data S input by a data searcher.

The input unit 405 is a search data acquisition unit that acquires search data S.

A plurality of pieces of search data S may be received simultaneously.

In that case, the following process is performed in the same way on each piece of the search data.

As mentioned above, together with the search data, the input unit 405 may receive from the data searcher a plurality of storage data names that specify storage encrypted data sets to be searched with the search data.

In S802, the encryption unit 406 receives a random number (j, R$_{(j)}$) from the random number storage unit 402. Note that $1 \leq j \leq M$, where M is equal to the number of storage encrypted data sets (ID(D), C(D$_{(j)}$)) that have been registered by the registration device 300.

In S802, random numbers R$_{(1)}$ to R$_{(M)}$ are acquired.

In S803, the encryption unit 406 encrypts the search data S.

The process of S803 is performed by the encryption unit 406. The encryption unit 406 reads out the key K and the key K' from the key storage unit 404, and generates search encrypted data T, as described below, for the search data S received in S801. The search encrypted data T normally has a plurality of elements, so that it is denoted as $\vec{T}$ in vector representation. The search encrypted data $\vec{T}$ has $u_{(j)}$ which is an element corresponding to each j. Note that $\vec{u_{(j)}}$ also has a plurality of elements, so that it is denoted as $\vec{u_{(j)}}$ in vector representation. Note that $\vec{u_{(j)}}$ corresponds to j, which means that it corresponds to the random number R$_{(j)}$.

(When j=1)

First, a case where j=1 will be considered. The encryption unit 406 partitions the search data S to generate $(S_1, \ldots, S_k)$.

Note that partitioning is not necessarily required. The search data S may be used without being partitioned.

When partitioning is performed, the encryption unit 406 partitions the search data S into a plurality of pieces of element data $S_i$ (i=1, ..., k), and with regard to each random number R$_{(j)}$, encrypts each piece of the element data $S_i$ with this random number R$_{(j)}$, as encryption of the search data S. A specific example will be described later with reference to FIG. 10.

A case where the search data S is partitioned into k pieces will be described below. Note that k may be any number.

Next, $u_{(1)}^{\rightarrow}=(u_1, \ldots, u_k)$ is generated.

Each ciphertext is generated as indicated below.

$$u_{i(1)}=E(K, S_1<+>u_{i-1(1)}) \quad \text{(Expression 3)}$$

$$u_0=R_{(j)} \quad \text{(Expression 4)}$$

Expression 3 has the same meaning as Expression 1.

Next, the encryption unit 406 acquires one generation random number R' generated by the random number generation unit 409. The random number generation unit 409 generates a generation random number R' for each piece of the search data S of the plurality of pieces of the search data S acquired by the input unit 405 which is the search data acquisition unit. The encryption unit 406 uses the generation random number R', which is generated by the random number generation unit 409 for each piece of the search data S, for a corresponding piece of the search data S.

Using the generation random number R', the encryption unit 406 generates $$t_{(j=1)}=E(K', R', u_{1(1)}, \ldots, u_{k(1)}). \quad \text{(Expression 5)}$$

Note that E denotes an encryption function.

It may be $t_{(1)}=E(K', R', u_{k(1)})$.

That is, it may be $t_{(j)}=E(K', R', u_{k(j)})$.

The above is the process when j=1.

(Process when j=2 to j)

The encryption unit 406 executes the generation of $t_{(j)}$ of Expression 5 for every (j, $R_{(j)}$) received from the random number storage unit 402.

That is, $t_{(1)}$ is generated in Expression 5, and $t_{(2)}$ to $t_{(M)}$ are also generated in the same way.

These are described as follows.

$$t_{(2)}=E(K', R', u_{1(2)}, \ldots, u_{k(2)}),$$

$$\ldots,$$

$$t_{(M)}=E(K', R', u_{1(M)}, \ldots, u_{k(M)})$$

Note that $t_{(2)}$, $t_{(3)}$, and the like differ from Expression 3 in the random number $R_{(2)}$, $R_{(3)}$, and the like.

When there are M pairs of (j, $R_{(j)}$), M pieces of $t_{(j)}$ are generated.

All the M pieces of $t_{(j)}$ are referred to as the search encrypted data $T^{\rightarrow}$ and denoted as $T^{\rightarrow}=(t_{(1)}, \ldots, t_{(M)})$, as described above.

In S804, the transmission unit 407 transmits the search encrypted data $T^{\rightarrow}$ and the generation random number R' generated in 5803 as a pair to the management device 500. If a storage data name has been input in 5801, the storage data name is also transmitted.

Specifically, the transmission unit 407 transmits the search encrypted data $T^{\rightarrow}$ to the management device 500 which has, with regard to each random number of the same plurality of random numbers $R_j$ as the plurality of random numbers $R_j$ stored in the random number storage unit 402, a plurality of pieces of encrypted data $C(D_{(j)})$ encrypted with that random number.

(Specific Example of the Search Process)

Figure 10:
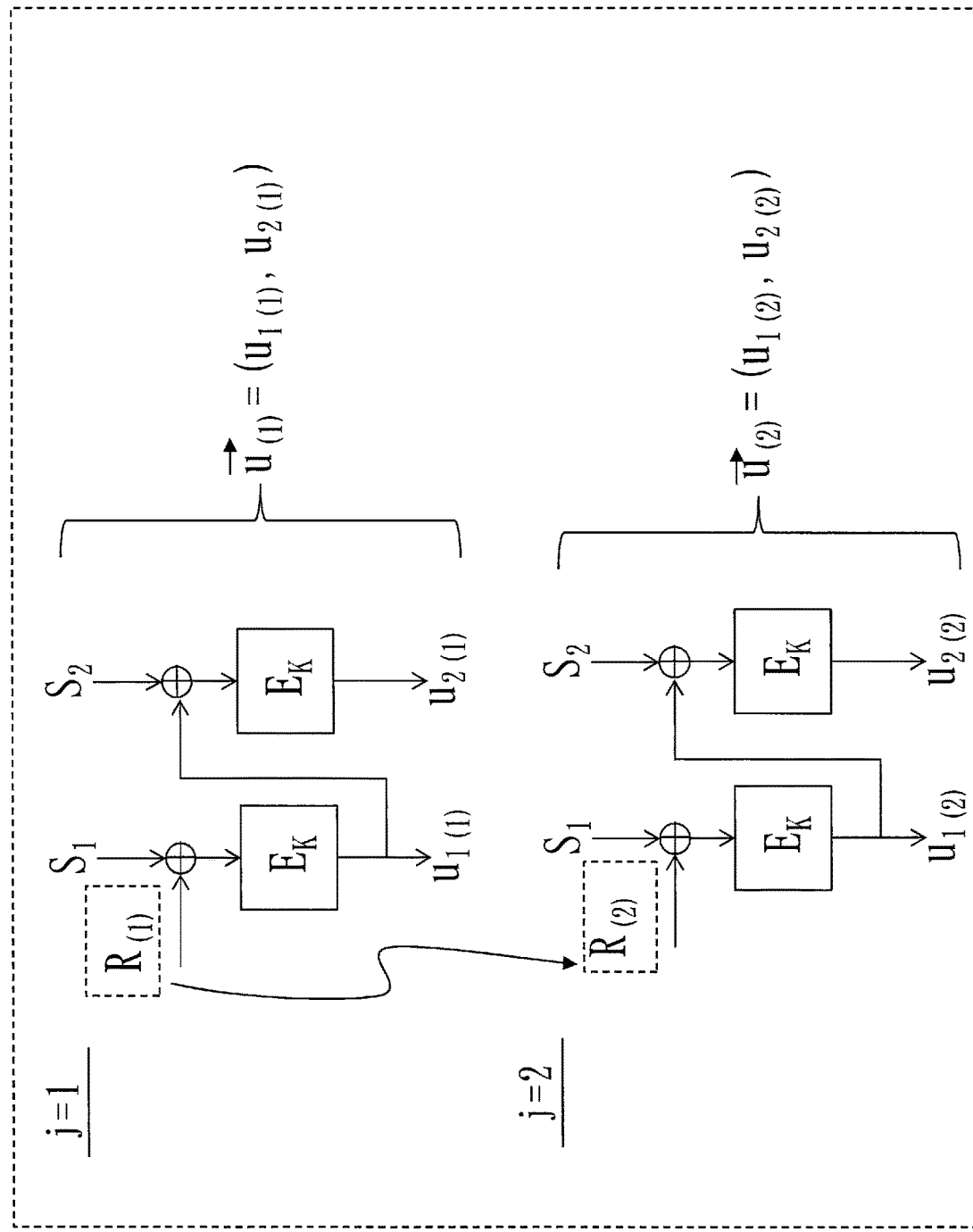
FIG. 10 is a diagram of the first embodiment and is a diagram explaining an encryption process by the search device.

The generation of $T^{\rightarrow}$ will be described using a specific example with reference to FIG. 10. FIG. 10 is a diagram explaining an encryption process by the search device.

<1. Partitioning the Search Data S>

(j=1)

It is assumed that there are two pairs (1, $R_1$) and (2, $R_2$) as (j, $R_j$).

It is assumed that the search data S is partitioned as S=($S_1$, $S_2$).

<2. Generating $u_{(1)}^{\rightarrow}$>

Since $u_{(1)}^{\rightarrow}$ has the same number of elements as the number of partitions, it has two elements.

$$u_{(1)}^{\rightarrow}=(u_{1(1)}, u_{2(1)})$$

In $u_{i(1)}=E(K, s_1<+>u_{i-1(1)})$ of Expression 3, i=1, 2.

FIG. 10 illustrates the generation of $u_{(1)}^{\rightarrow}$ and $u_{(2)}^{\rightarrow}$ when j=1, 2.

$$u_{1(1)}=E(K, S_1<+>u_{0(1)})=E(K, S_1<+>R_{(1)}),$$

$$u_{2(1)}=E(K, S_2<+>u_{1(1)})=E(K, S_2<+>E(K, S_1<+>R_{(1)})),$$

(j=2)

Each element in $u_{(2)}=(u_{1(2)}, u_{2(2)})$ differs from $u_{(1)}^{\rightarrow}$ only in that the random number $R_{(1)}$ is replaced with the random number $R_{(2)}$.

This will be described below.

(When j=2)

$$u_{1(2)}=E(K, S_1<+>u_{0(2)})=E(K, S_1<+>R_{(2)})$$

$$u_{2(2)}=E(K, S_2<+>u_{1(2)})=E(K, S_2<+>E(K, S_1<+>R_{(2)})),$$

With the above, $u_{(1)}^{\rightarrow}$ and $u_{(2)}^{\rightarrow}$ are generated for (1, $R_1$) and (2, $R_2$).

<3. Generating Search Encrypted Data>

The above Expression 5 indicates the following.

$$t_{(j)}=E(K', R', u_{1(j)}, \ldots, u_{k(j)})$$

In the specific example where j=1, 2, this is as follows.

$$t_{(1)}=E(K', R', u_{1(1)}, u_{2(1)})$$

$$t_{(2)}=E(K', R', u_{1(2)}, u_{2(2)})$$

Accordingly, $$T^{\rightarrow}=(t_{(1)}, \ldots, t_{(M)})$$

is represented as $$T^{\rightarrow} \rightarrow (t_{(1)}, t_{(2)})$$

in the specific example.

When $t_{(1)}$ is described specifically, it is represented as follows.

$$t_{(1)} = E(K', R', u_{1(1)}, u_{2(1)})$$
$$= E(K', R', E(K, S_1\langle+\rangle R_{(1)}), E(K, S_2\langle+\rangle E(K, S_1\langle+\rangle R_{(1)})))$$

When $t_{(2)}$ is described specifically, it differs from $t_{(1)}$ only in that an element u is replaced with $u_{(2)}$.

$$t_{(2)} = E(K', R', u_{1(2)}, u_{2(2)})$$
$$= E(K', R', E(K, S_1\langle+\rangle R_{(2)}), E(K, S_2\langle+\rangle E(K, S_1\langle+\rangle R_{(2)})))$$

The transmission unit 407 transmits the search encrypted data $T^{\rightarrow}$ and the generation random number R' which is a generation random number to the management device 500.

The above is the specific example in the search device 400.

As described with reference to the specific example of FIG. 10, with regard to each random number $R_j$ stored in the random number storage unit 402, the encryption unit 406 encrypts the search data S, which is a keyword used for searching of data to be searched, with that random number $R_j$ by a cryptographic mode capable of searchable encryption, and thereby generates $\vec{u}_{(1)}$, $\vec{u}_{(2)}$, and the like. Then, the encryption unit 406 generates search encrypted data $\vec{T}$ including $\vec{u}_{(1)}$, $\vec{u}_{(2)}$, and the like which are a plurality of pieces of search encrypted data. The encryption unit 406 generates the search encrypted data $\vec{T}$ by encrypting, with the generation random number R' generated by the random number generation unit 409, each piece of search data $\vec{u}_{(1)}$, $\vec{u}_{(2)}$, and the like which, with regard to each random number $R_{(j)}$, has been encrypted with that random number $R_{(j)}$.

In S805, the receiving unit 501 of the management device 500 receives the search encrypted data $\vec{T}$ from the search device 400.

In S806, the matching unit 504 of the management device 500 reads out the storage encrypted data set (ID(D), C(D$_{(j)}$)) from the data storage unit 503. If a storage data name has also been received in S805, the matching unit 504 reads out only the target storage encrypted data set based on that storage data name If the receiving unit 501 has not received a storage data name in S805, all the stored storage encrypted data sets (ID(D), C(D$_{(1)}$)) to (ID(D), C(D$_{(M)}$)) are read out.

In S807, the matching unit 504 generates an empty set I concerning a search result.

The matching unit 504 also receives the search encrypted data $\vec{T} = (t_{(1)}, \ldots, t_{(M)})$ from the receiving unit 501.

In S807, the matching unit 504 generates matching data $t'_i$ as described below.

A specific example will be described below.

It is assumed that the management device 500 has received the generation random number R', the search encrypted data $\vec{T}$, the storage encrypted data set (ID(D), C(D)), the key K', and the parameter L. The generation random number R' and the search encrypted data $\vec{T}$ have been received from the search device 400. The storage encrypted data set (ID(D), C(D)) has been received from the registration device 300. The key K' and the parameter L have been received from the key generation device 200. The management device 500 performs matching based on the search encrypted data $\vec{T}$, and outputs a search result.

It is assumed that the management device 500 has received $\vec{T} = (t_{(1)}, t_{(2)})$ and the generation random number R'. It is assumed that the management device 500 reads out two storage encrypted data sets (ID(D), C(D$_{(1)}$)) and (ID(D), C(D$_{(2)}$)).

That is, j=1, 2.

Note that (ID(D), C(D$_{(1)}$)) is (ID(D), C(D$_{j=1}$)) described above, and $$C(D_{j=1}) = \{\vec{C}_1, \vec{C}_2, \vec{C}_3\} = \{(c_{1,1} \sim c_{1,3}), (c_{2,2} \sim c_{2,3}), (c_{3,3})\}.$$

Based on the search encrypted data $\vec{T} = (t_{(1)}, t_{(2)})$, the management device 500 performs matching as described below.

With regard to $\vec{C}_1$, $\vec{C}_2$, and $\vec{C}_3$ of $C(D_{(1)}) = \{\vec{C}_1, \vec{C}_2, \vec{C}_3\}$, the following $t'_i$ is calculated.

Generally, it is as indicated below.

$$t'_i = E(K', R', \vec{C}_i) \quad \text{(Expression 6)}$$

In this example, $t'_i$ = is generated for each of $\vec{C}_1$, $\vec{C}_2$, and $\vec{C}_3$.

That is, $$t'_1 = E(K', R', \vec{C}_1),$$

$$t'_2 = E(K', R', \vec{C}_2), \text{ and}$$

$$t'_3 = E(K', R', \vec{C}_3).$$

Based on the specific example of S704, $$\vec{C}_1 = (c_{1,1}, c_{1,2}, c_{1,3}),$$

$$\vec{C}_2 = (c_{2,2}, c_{2,3}), \text{ and}$$

$$\vec{C}_3 = (c_{3,3}). \text{ Therefore, it follows that}$$

$$t'_1 = E(K', R', \vec{C}_1) = E(K', R', c_{1,1}, c_{1,2}, c_{1,3}),$$

$$t'_2 = E(K', R', \vec{C}_2) = E(K', R', c_{2,2}, c_{2,3}), \text{ and}$$

$$t'_3 = E(K', R', \vec{C}_3) = E(K', R', c_{3,3}).$$

The values of $c_{1,1}$, $c_{1,2}$, and the like are as explained in the description of S803.

In Expression 6 above, $\vec{C}_1$ is used in $t'_1$. That is, all the elements of $\vec{C}_1$ are used to generate $t'_i$. Alternatively, the last element $c_{i,L}$ of $\vec{C}_i$ may be used. In this case, it is a prerequisite that $t_{(j)} = E(K', R', u_{k(j)})$ is used in S803.

In S808, the matching unit 504 generates an empty set I concerning a search result, and checks whether each piece of the matching data $t_i$ ($1 \leq i \leq L$) generated in S807 is included in the search encrypted data $\vec{T}$. With regard to each piece of the matching data $t'_i$, if the matching data $t'_i$ is included in the search encrypted data $\vec{T}$, (ID(D), i) is included in the empty set I. Although the storage encrypted data set of C(D$_{(1)}$) (j=1) has been explained above, the matching unit 504 performs the above on all the storage encrypted data sets (j=2 to M).

The set I that is finally generated from the initial empty set I as a result of this process will be referred to as a search result I.

In S809, the transmission unit 505 transmits the search result I generated in S808 to the search device 400.

In S810, the receiving unit 403 of the search device 400 receives the search result I transmitted in S809.

In S811, the output unit 408 outputs the search result I received in S810.

S811 completes the search process of the searchable encryption system 100.

<*Effects of the First Embodiment*>

This embodiment achieves the following effects.

(1) In this embodiment, even if the same storage data is stored in the server, a storage encrypted data set which is always different each time is generated with the random number R. For this reason, resistance to a frequency analysis attack is enhanced, and searchable encryption with partial matching with high security can be realized.

(2) In this embodiment, the search encrypted data is composed of a single ciphertext, so that the data size used in searching is very small, and only one interaction between the data searcher and the server occurs in searching. Thus, partial match searching by searchable encryption can be performed efficiently.

(3) In this embodiment, the generation random number R' is used for the search encrypted data, so that a frequency analysis attack is difficult and the resistance to the frequency analysis attack is enhanced.

(4) In this embodiment, the storage data is encrypted and then stored. Thus, even if the storage encrypted data set is leaked from the management device 500, the content of the storage data cannot be known.

(5) In this embodiment, it is possible to process not only the search data but also the storage data while they remain encrypted, so that the content of the search data cannot be known from the search encrypted data.

Second Embodiment

A second embodiment will now be described. In the second embodiment, the system configuration and the configuration of each device are the same as those in the first embodiment. In the first embodiment, the CBC mode is employed as illustrated in FIG. 9 and FIG. 10. In the second embodiment, a Counter mode (CTR mode) is employed.

In the first embodiment, the encryption unit 307 may be configured to operate as described below in the registration device 300.

(Operation of the Encryption Unit 307)

The encryption unit 307 reads out a key K from the key storage unit 302, and generates a ciphertext as described below, using a random number R generated by the random number generation unit 306.

It is assumed that storage data $D_{(1)}$ has been partitioned as $(w_1, \ldots, w_L)$.

Note that $w_1, \ldots, w_L$ are w, (i=1, 2, ..., L).

The encryption unit 307 performs the following operation on $(w_1, \ldots, w_L)$.

$$C_i = E(K, R+i-1) <+> w_i \qquad \text{(Expression 7)}$$

Then, the encryption unit 307 generates a storage encrypted data set $(ID(D), C(D_{(1)}))$.

Note that $C(D_{(1)}) = (C_i, C_2, \ldots, C_L)$.

That is, the number of elements in $C(D_{(1)})$ is the number of partitions of the storage data.

Figure 13:
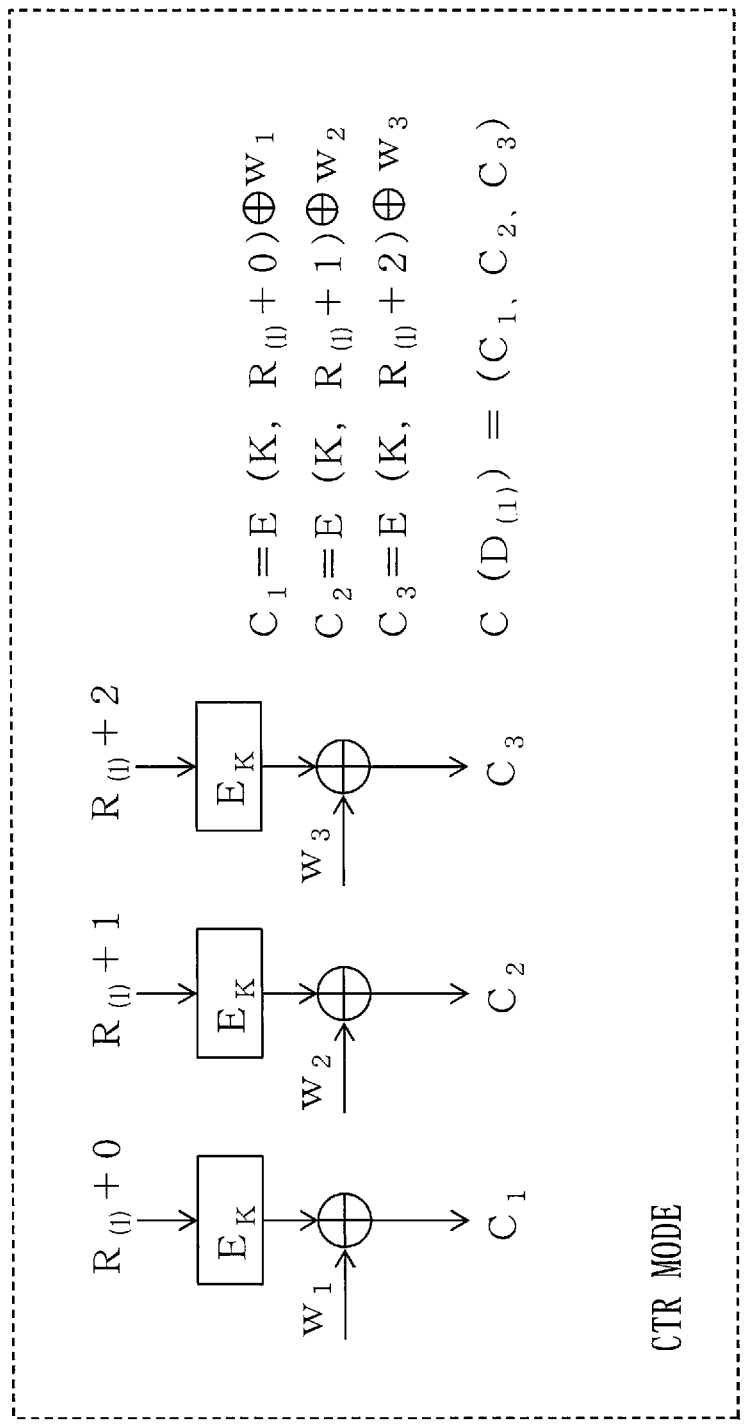
FIG. 13 is a diagram of a second embodiment and is a diagram explaining an encryption process by a registration device.

FIG. 13 illustrates a specific example of generating $C_1$ to $C_3$ by the CTR mode. It is assumed that the storage data $D_{(1)}$ has been partitioned as $(w_1, w_2, w_3)$.

The encryption unit 307 generates $C(D_{(1)}) = (C_1, C_2, C_3)$.

Note thus that in $C(D_{(1)})$, $$C_1 = E(K, R+0) <+> w_1,$$

$$C_2 = E(K, R+1) <+> w_2, \text{ and}$$

$$C_3 = E(K, R+2) <+> w_3.$$

Note that $C_1$ to $C_3$ correspond to $w_1$ to $w_3$.

That is, $C_i$ corresponds to $w_1$.

(Operation of the Search Device 400)

When the encryption unit 307 of the registration device 300 is configured to operate as described above, the encryption unit 406 of the search device 400 is configured to operate as described below.

(Operation of the Encryption Unit 406)

Figure 14:
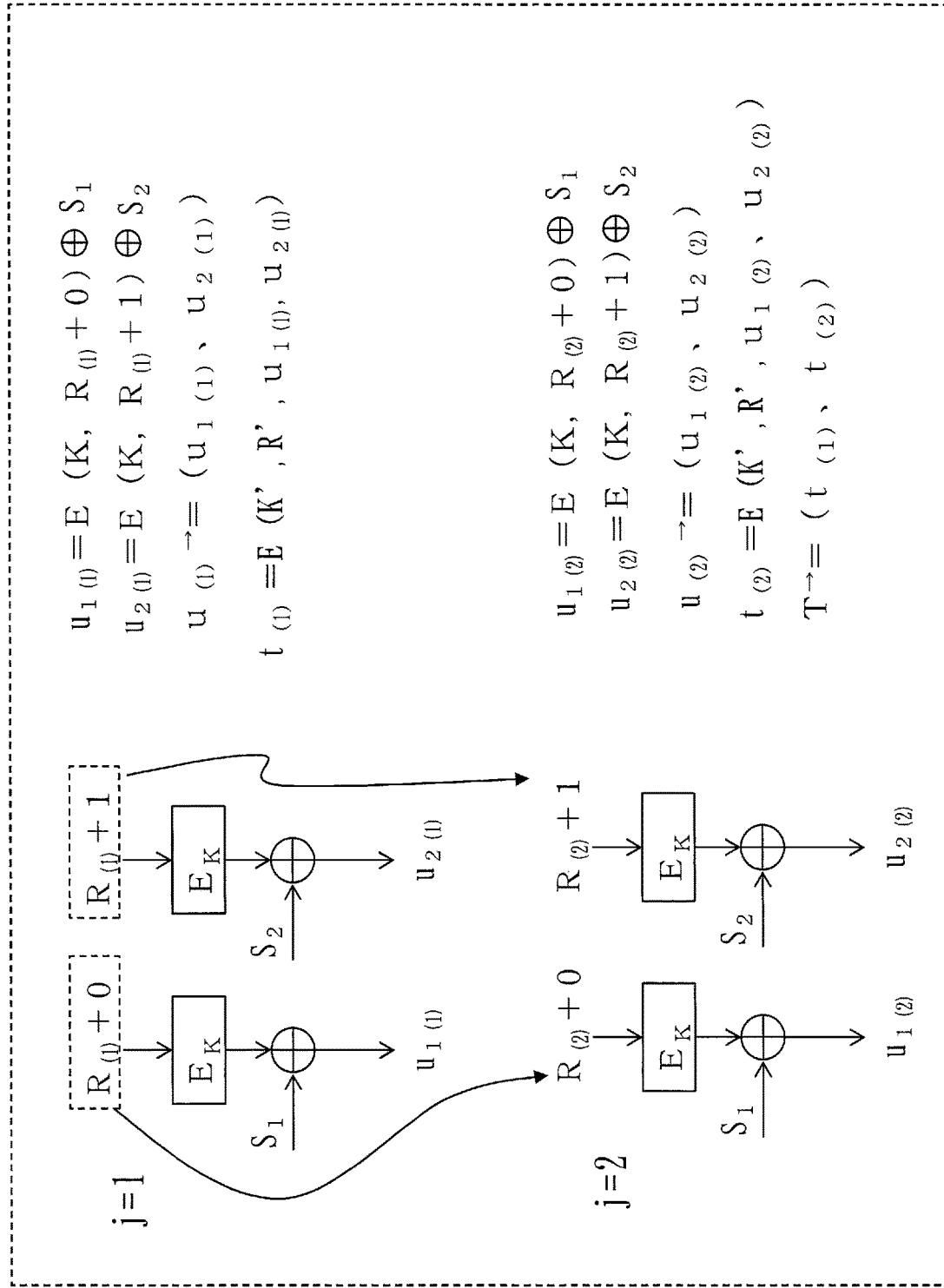
FIG. 14 is a diagram of the second embodiment and is a diagram explaining an encryption process by a search device.

FIG. 14 is a diagram explaining the operation of the encryption unit 406 of the search device 400 according to the second embodiment.

A description will be given with reference to FIG. 14. The encryption unit 406 reads out the key K from the key storage unit 404, and generates a ciphertext t as described below by using the key K on search data S received from the input unit 405.

First, the search data S is partitioned as $(S_1, \ldots, S_k)$.

In FIG. 14, the search data S is partitioned as $(S_1, S_2)$. Note that partitioning may be omitted as in the first embodiment.

Next, the encryption unit 406 reads out $(j, R_j)$ from the random number storage unit 402, and generates $u = (u_1, \ldots, u_k)$.

Note that k is the number of partitions of the search data S.

Each ciphertext is calculated as follows.

$$u_i = E(K, R_{(j)}+i-1) <+> S_i$$

Note that i=1, ..., k.

Next, the encryption unit 406 acquires one generation random number R' generated by the random number generation unit 409.

Then, the encryption unit 406 calculates $$t_{(j)} = E(K', R', u_{1(j)}, \ldots, u_{k(j)}) \text{ for } j=1.$$

In the example of FIG. 14, $$t_{(1)} = E(K', R', u_{1(1)}, u_{2(1)}) \text{ is calculated.}$$

Note that $$u_{1(1)} = E(K, R_{(1)}) <+> S_1, \text{ and}$$

$$u_{2(1)} = E(K, R_{(1)}+1) <+> S_2.$$

Similarly, the encryption unit 406 calculates $$t_{(2)} = E(K', R', u_{1(2)}, u_{2(2)}) \text{ for } j=2.$$

Note that $$u_{1(2)} = E(K, R_{(2)}) <+> S_1, \text{ and}$$

$$u_{2(2)} = E(K, R_{(2)}+1) <+> S_2.$$

The encryption unit 406 generates search encrypted data $\vec{T} = (t_{(1)}, t_{(2)})$.

The transmission unit 407 transmits the search encrypted data $\vec{T} = (t_{(1)}, t_{(2)})$ and the generation random number R' to the management device 500.

When the encryption unit 307 of the registration device 300 and the encryption unit 406 of the search device 400 are configured to operate as described above, the matching unit 504 of the management device 500 is configured to operate as described below.

(Operation of the Matching Unit 504)

The matching unit 504 generates an empty set I concerning a search result, and reads out all the storage encrypted data sets $(ID(D), C(D_{(j)}))$ from the data storage unit 503.

Based on the received search encrypted data $\vec{T} = (t_{(1)}, \ldots, t_{(M)})$, the matching unit 504 performs matching and generates a search result as described below.

In this example, the search encrypted data $\vec{T} = (t_{(1)}, t_{(2)})$.

In the following, a description will be given using $C(D_{(1)}) = (C_1, C_2, C_3)$ described above as an example.

The matching unit 504 calculates the following $t'_{(j)}$ with regard to $C(D_{(1)})$.

In this example, j=1 and thus $t'_{(j)} = t'_{(1)}$.

The following is calculated.

$$t'_{(j)} = E(K', R', C(D_{(j)})) = E(K', R', C_1, \ldots, C_L) \qquad \text{(Expression 8)}$$

Here, the number of elements in $C(D_{(1)})$ is L elements $C_1, \ldots, C_L$, where L is the number of partitions of the storage data $D_{(1)}$.

Accordingly, in this example it follows that $$t'_{(1)} = E(K', R', C(D_{(1)})) = E(K', R', C_1, C_2, C_3).$$

The matching unit 504 performs the same process as that on $C(D_{(1)})$ also on $C(D_{(2)})$ to $C(D_{(M)})$.

With regard to each $t'_{(j)}$ (j=1, 2, ..., M), if that $t'_{(j)}$ is included in the search encrypted data $\vec{T}$, the matching unit 504 includes $(ID(D_{(j)}), j)$ in I.

The set I that is finally generated as a result of this process will be referred to as a search result I, as in the first embodiment.

The second embodiment differs from the first embodiment only in the cryptographic mode to be employed, and thus achieves the same effects as those of the first embodiment.

The system configuration and the functions and hardware configuration of each device are the same as those of the first embodiment. What is different from the first embodiment is the cryptographic mode.

The operation of each of the key generation device 200, the registration device 300, the search device 400, and the management device 500 disclosed in the first embodiment and the second embodiment may be interpreted as a method or a program. The registration device 300 which is an encryption device operates by an encryption program. The operation of the registration device 300 is equivalent to an encryption method. The search device 400 operates by a search program. The operation of the search device 400 is equivalent to a search method.

REFERENCE SIGNS LIST

100: searchable encryption system, 101: Internet, 200: key generation device, 201: input unit, 202: key generation unit, 203: transmission unit, 300: registration device, 301: receiving unit, 302: key storage unit, 303: parameter storage unit, 304: input unit, 305: data partition unit, 306: random number generation unit, 307: encryption unit, 308: transmission unit, 309: random number transmission unit, 400: search device, 401: random number input unit, 402: random number storage unit, 403: receiving unit, 404: key storage unit, 405: input unit, 406: encryption unit, 407: transmission unit, 408: output unit, 409: random number generation unit, 500: management device, 501: receiving unit, 502: parameter storage unit, 503: data storage unit, 504: matching unit, 505: transmission unit

The invention claimed is:

1. An encryption device comprising:
 processing circuitry to:
 partition data to be searched, which has a data structure that can be partitioned sequentially from a front, into N pieces of element data from first to Nth pieces sequentially from the front; and
 using the N pieces of element data obtained by partitioning, generate a first set in which the first to Nth pieces of element data are sequentially arranged, a second set excluding the first piece of element data in which the second to Nth pieces of element data are sequentially arranged, thereafter sequentially to an N−1th set excluding the first to N−2th pieces of element data in which the N−1th to Nth pieces of element data are sequentially arranged, and an Nth set excluding the first to N−1th pieces of element data and composed of the Nth piece of element data, and encrypt each piece of element data included in each of the generated sets with a random number by one of a CBC mode which is a cryptographic mode capable of searchable encryption and a CTR mode which is a cryptographic mode capable of searchable encryption.

2. The encryption device according to claim 1,
 wherein the processing circuitry encrypts each piece of element data included in each set with the random number by the CBC mode by performing an exclusive OR operation on the random number and the first piece of element data in the set in a first stage of the CBC mode, and in second and subsequent stages of the CBC mode, performing an exclusive OR operation on an output value of a preceding stage and a piece of element data sequentially next after the piece of element data used in the exclusive OR operation in the preceding stage, for each set of the first set to the Nth set.

3. The encryption device according to claim 1,
 wherein the processing circuitry encrypts each piece of element data included in each set with the random number by the CTR mode by encrypting a sum of the random number and a counter value in each stage of the CTR mode, and performing an exclusive OR operation on a value of the encrypted sum and each piece of element data in the set, in each stage of the CTR mode, for each set of the first set to the Nth set.

4. A non-transitory computer readable medium storing an encryption program for causing a computer to execute:
 a process to partition data to be searched, which has a data structure that can be partitioned sequentially from a front, into N pieces of element data from first to Nth pieces sequentially from the front; and
 a process to, using the N pieces of element data obtained by partitioning, generate a first set in which the first to Nth pieces of element data are sequentially arranged, a second set excluding the first piece of element data in which the second to Nth pieces of element data are sequentially arranged, thereafter sequentially to an N−1th set excluding the first to N−2th pieces of element data in which N−1th to Nth pieces of element data are sequentially arranged, and an Nth set excluding the first to N−1th pieces of element data composed of the Nth piece of element data, and encrypt each piece of element data included in each of the generated sets with a random number by one of a CBC mode which is a cryptographic mode capable of searchable encryption and a CTR mode which is a cryptographic mode capable of searchable encryption.

5. An encryption method comprising:
 using a processor to partition data to be searched, which has a data structure that can be partitioned sequentially from a front, into N pieces of element data from first to Nth pieces sequentially from the front; and
 using the processor to generate, using the N pieces of element data obtained by partitioning, a first set in which the first to Nth pieces of element data are sequentially arranged, a second set excluding the first piece of element data in which the second to Nth pieces of element data are sequentially arranged, thereafter sequentially to an N−1th set excluding the first to N−2th pieces of element data in which the N−1th to Nth pieces of element data are sequentially arranged, and an Nth set excluding the first to N−1th pieces of element data and composed of the Nth piece of element data, and encrypt each piece of element data included in each of the generated sets with a random number by one of a CBC mode which is a cryptographic mode capable of searchable encryption and a CTR mode which is a cryptographic mode capable of searchable encryption.

6. A search device comprising:
 processing circuitry to:
 store a plurality of random numbers;
 encrypt, with regard to each random number stored, search data with said each random number by a cryptographic mode capable of searchable encryption, the search data being a keyword used for searching of data to be searched, and encrypt, with a generated generation random number, each piece of the search data which, with regard to each random number, has been encrypted with said each random number, and thereby generate search encrypted data including a plurality of pieces of the search data which have been encrypted with the generation random number; and
 transmit the search encrypted data to a management device that has, with regard to each random number of same plurality of random numbers as the plurality of random numbers stored, a plurality of pieces of encrypted data encrypted with said each random number.

7. The search device according to claim 6,
wherein the processing circuitry acquires the search data,
generates a generation random number for each piece of the search data of a plurality of pieces of the search data acquired, and
uses the generation random number generated for each piece of the search data for encryption of a corresponding piece of the search data.

8. The search device according to claim 6,
wherein the processing circuitry partitions the search data into a plurality of pieces of element data, and for each random number, encrypts each piece of element data with said each random number, as the encryption of the search data.

9. The search device according to claim 6,
wherein the processing circuitry transmits, as a pair, the search encrypted data and the generation random number used to generate the search encrypted data.

10. A non-transitory computer readable medium storing a search program for causing a computer to execute:
a process to store a plurality of random numbers;
a process to generate a random number;
a process to, with regard to each random number stored, encrypt search data with said each random number by a cryptographic mode capable of searchable encryption, the search data being a keyword used for searching of data to be searched, and encrypt, with a generation random number generated by the process to generate the random number, each piece of the search data which, with regard to each random number, has been encrypted with said each random number, and thereby generate search encrypted data including a plurality of pieces of the search data which have been encrypted with the generation random number; and
a process to transmit the search encrypted data to a management device that has, with regard to each random number of same plurality of random numbers as the plurality of random numbers stored, a plurality of pieces of encrypted data encrypted with said each random number.

11. A search method comprising:
storing a plurality of random numbers;
generating a random number;
encrypting, with regard to each random number stored, search data with said each random number by a cryptographic mode capable of searchable encryption, the search data being a keyword used for searching of data to be searched, and encrypting, with a generated generation random number, each piece of the search data which, with regard to each random number, has been encrypted with said each random number, and thereby generating search encrypted data including a plurality of pieces of the search data which have been encrypted; and
transmitting the search encrypted data to a management device that has, with regard to each random number of same plurality of random numbers as the plurality of random numbers stored, a plurality of pieces of encrypted data encrypted with said each random number.

* * * * *